US009319631B2

(12) United States Patent
Kato et al.

(10) Patent No.: US 9,319,631 B2
(45) Date of Patent: Apr. 19, 2016

(54) EXTERNAL INPUT APPARATUS, COMMUNICATION TERMINAL, DISPLAY DATA SHARING SYSTEM AND COMPUTER READABLE INFORMATION RECORDING MEDIUM

(75) Inventors: Yoshinaga Kato, Kanagawa (JP); Kenji Tanaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 214 days.

(21) Appl. No.: 13/988,062

(22) PCT Filed: Nov. 16, 2011

(86) PCT No.: PCT/JP2011/076972
§ 371 (c)(1),
(2), (4) Date: May 17, 2013

(87) PCT Pub. No.: WO2012/073768
PCT Pub. Date: Jun. 7, 2012

(65) Prior Publication Data
US 2013/0242033 A1    Sep. 19, 2013

(30) Foreign Application Priority Data

Nov. 30, 2010  (JP) ................................. 2010-267774
Aug. 10, 2011  (JP) ................................. 2011-175417

(51) Int. Cl.
*H04N 7/15* (2006.01)
*H04L 12/18* (2006.01)
(52) U.S. Cl.
CPC .............. *H04N 7/15* (2013.01); *H04L 12/1822* (2013.01); *H04L 12/1827* (2013.01)
(58) Field of Classification Search
USPC ..................................................... 348/14.08
See application file for complete search history.

(56) References Cited

U.S. PATENT DOCUMENTS 6,760,749 B1    7/2004  Dunlap et al.
2004/0024819 A1*  2/2004  Sasaki et al. ................... 709/205
(Continued)

FOREIGN PATENT DOCUMENTS

JP    H10-023383    1/1998
JP    2000-341659   12/2000
(Continued)

OTHER PUBLICATIONS

Extended European Search Report issued on Jul. 2, 2014 in the corresponding European Application No. 11844298.7.
(Continued)

*Primary Examiner* — Amal Zenati
(74) *Attorney, Agent, or Firm* — Oblon, McClelland, Maier & Neustadt, L.L.P.

(57) ABSTRACT

An external input apparatus connected with a communication terminal delivering conference data including voice or video to another set of equipment connected via a network is disclosed. The external input apparatus includes a first display part for displaying an image; an operation reception part for receiving a user's operation; an image obtaining part for obtaining image data of the image; an image data transmission part for transmitting the image data to the other set of equipment by using the communication terminal; a transition information storage part for registering, according to display control information reported by the communication terminal, a transition condition of a share menu which is used for receiving a sharing control operation for the image data; and a menu control part for displaying, by using the first display part, the share menu determined according to the display control information obtained from the communication terminal and the transition condition.

17 Claims, 38 Drawing Sheets

(56) References Cited

U.S. PATENT DOCUMENTS

| | | | |
|---|---|---|---|
| 2004/0207719 A1* | 10/2004 | Tervo | H04M 1/7253 348/14.02 |
| 2006/0015629 A1 | 1/2006 | Mori et al. | |
| 2008/0294992 A1* | 11/2008 | Liang | G06F 3/0481 715/733 |
| 2011/0043599 A1* | 2/2011 | Luo | G06F 1/1605 348/14.08 |
| 2012/0069132 A1 | 3/2012 | Kato | |
| 2013/0038676 A1 | 2/2013 | Tanaka et al. | |

FOREIGN PATENT DOCUMENTS

| | | |
|---|---|---|
| JP | 2006-018430 | 1/2006 |
| JP | 2008-234072 | 10/2008 |
| JP | 2012-085269 | 4/2012 |
| JP | 2011-254442 | 12/2015 |

OTHER PUBLICATIONS

International Search Report Issued Jan. 10, 2012 in PCT/JP2011/076972 filed on Nov. 16, 2011.

* cited by examiner

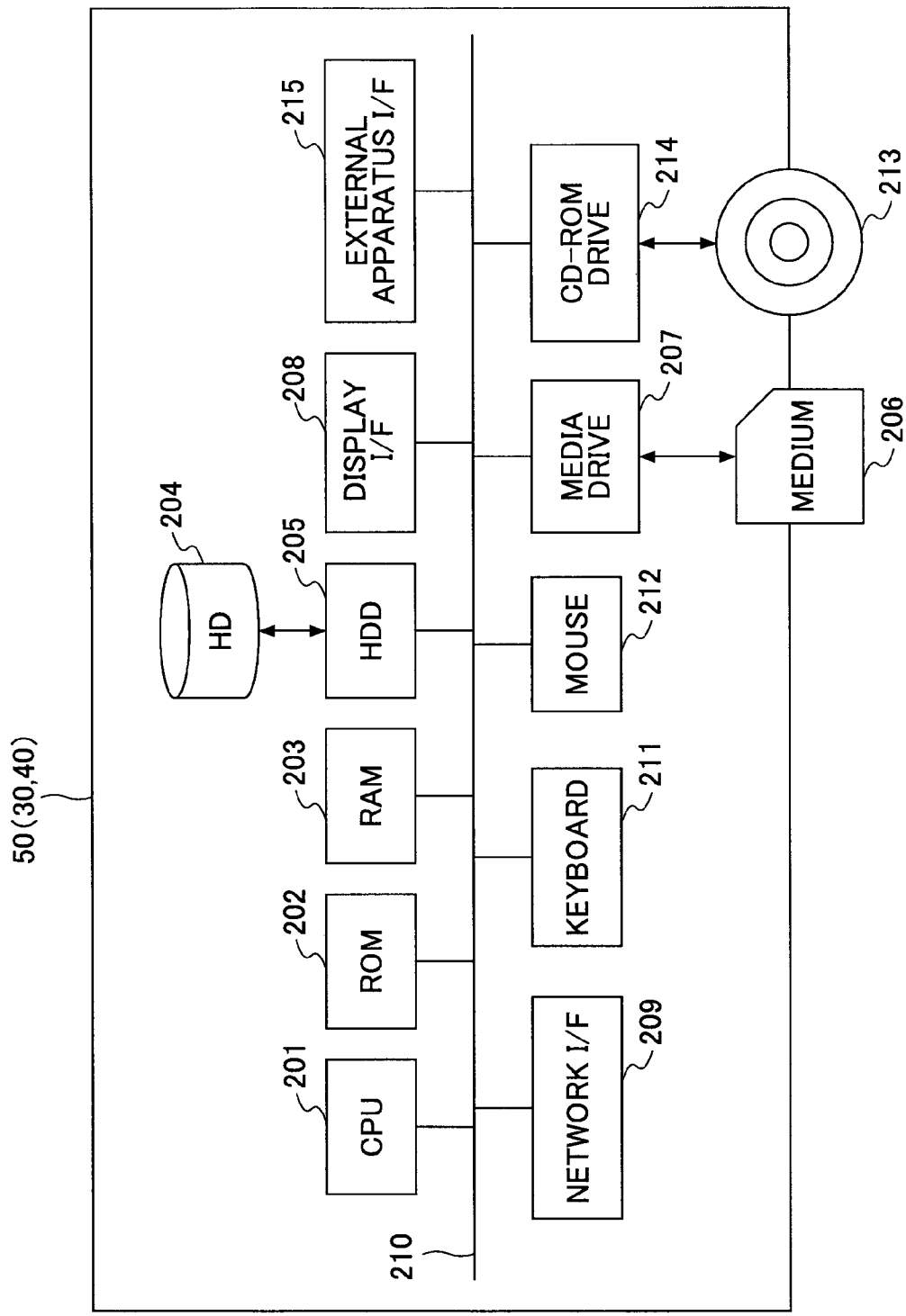

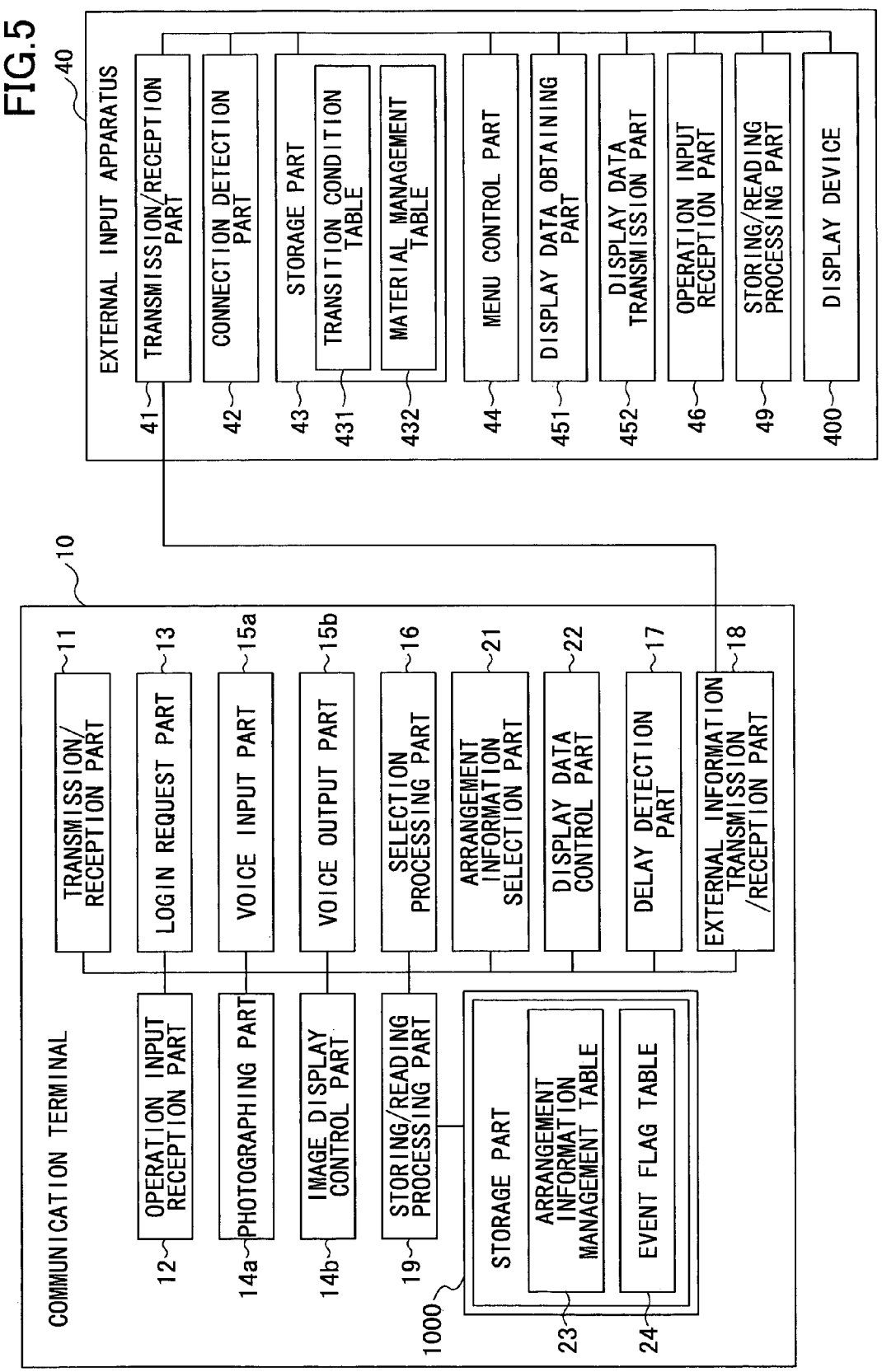

FIG.6

| NAME OF MATERIAL | SIZE | APPLICATION NAME | UPDATED TIME AND DATE | MATERIAL DATA |
|---|---|---|---|---|
| MATERIAL 1 | 300kB | DOCUMENT COMPOSITION SOFTWARE | M1 MONTH D1 DAY | 1.doc |
| MATERIAL 2 | 250kB | SPREADSHEET SOFTWARE | M2 MONTH D2 DAY | 2.xls |
| MATERIAL 3 | 690kB | PRESENTATION SOFTWARE | M3 MONTH D3 DAY | 3.ppt |

FIG.7

| IP ADDRESS OF RELAY DESTINATION TERMINAL | IMAGE QUALITY (QUALITY OF IMAGE) OF IMAGE DATA TO RELAY |
|---|---|
| 1.3.2.4 | HIGH IMAGE QUALITY |
| 1.3.1.3 | LOW IMAGE QUALITY |
| 1.3.4.3 | MEDIUM IMAGE QUALITY |
| ... | ... |

FIG.8

| RELAY APPARATUS ID | OPERATING STATE | RECEPTION DATE AND TIME | IP ADDRESS OF RELAY APPARATUS | MAXIMUM DATA TRANSMISSION RATE (Mbps) |
|---|---|---|---|---|
| 111a | ON-LINE | 2009.11.10.13:00 | 1.2.1.2 | 100 |
| 111b | ON-LINE | 2009.11.10.13:10 | 1.2.2.2 | 1000 |
| 111c | OFF-LINE | 2009.11.10.13:20 | 1.3.1.2 | 100 |
| 111d | ON-LINE | 2009.11.10.13:30 | 1.3.2.2 | 10 |

FIG.9

| TERMINAL ID | PASSWORD |
|---|---|
| 01aa | aaaa |
| 01ab | abab |
| 01ba | baba |
| ... | ... |

FIG.10

| TERMINAL ID | OPERATING STATE | RECEPTION DATE AND TIME | IP ADDRESS OF TERMINAL |
|---|---|---|---|
| 01aa | ON-LINE | 2009.11.10.13:40 | 1.2.1.3 |
| 01ab | OFF-LINE | 2009.11.09.12:00 | 1.2.1.4 |
| 01ba | ON-LINE | 2009.11.10.13:45 | 1.2.2.3 |
| ... | ... | ... | ... |
| 01db | ON-LINE | 2009.11.10.13:50 | 1.3.2.4 |

FIG.11

| REQUEST SOURCE TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.12

| SELECTION SESSION ID | RELAY APPARATUS ID | REQUEST SOURCE TERMINAL ID | DESTINATION TERMINAL ID | DELAY TIME (ms) | DELAY INFORMATION RECEPTION DATE AND TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.13

| DOT ADDRESS DIFFERENCES | ADDRESS PRIORITY |
|---|---|
| SAME. SAME. SAME. DIFF | 5 |
| SAME. SAME. DIFF. — | 3 |
| SAME. DIFF. —. — | 1 |
| DIFF. —. —. — | 0 |

FIG.14

| MAXIMUM DATA TRANSMISSION RATE IN RELAY APPARATUS (Mbps) | TRANSMISSION RATE PRIORITY |
|---|---|
| 1000~ | 5 |
| 100~1000 | 3 |
| 10~100 | 1 |
| ~10 | 0 |

FIG.15

| DELAY TIME (ms) | IMAGE QUALITY (QUALITY OF IMAGE) OF IMAGE DATA |
|---|---|
| 0~100 | HIGH IMAGE QUALITY |
| 100~300 | MEDIUM IMAGE QUALITY |
| 300~500 | LOW IMAGE QUALITY |
| 500~ | (INTERRUPTION) |

FIG.16

| ARRANGEMENT INFORMATION No | ARRANGEMENT INFORMATION | SHARE FLAG |
|---|---|---|
| 1 | VIEW_MULTI | UNSHARED |
| 2 | SHARED_MULTI | SHARED |

| ARRANGEMENT INFORMATION | AREA 1 | AREA 2 | AREA 3 | AREA 4 |
|---|---|---|---|---|
| VIEW_MULTI | VIDEO DATA 1 | VIDEO DATA 2 | .. | |
| SHARED_MULTI | DISPLAY DATA | VIDEO DATA 1 | VIDEO DATA 2 | .. |

FIG.20

| TYPE OF EVENT | SHARE FLAG | DISPLAY CONTROL FLAG |
|---|---|---|
| DELIVERY START EVENT | SHARED | SHARED |
| DELIVERY FROM ANOTHER START EVENT | SHARED | SHARED_ANOTHER |
| DELIVERY STOP EVENT | UNSHARED | UNSHARED |
| DELIVERY FROM ANOTHER STOP EVENT | UNSHARED | UNSHARED |

FIG.21B

| DISPLAY CONTROL FLAG | SHARING STATE |
|---|---|
| SHARED | THIS DISPLAY SHARED |
| SHARED_ANOTHER | ANOTHER DISPLAY SHARED |
| UNSHARED | NOT SHARED |

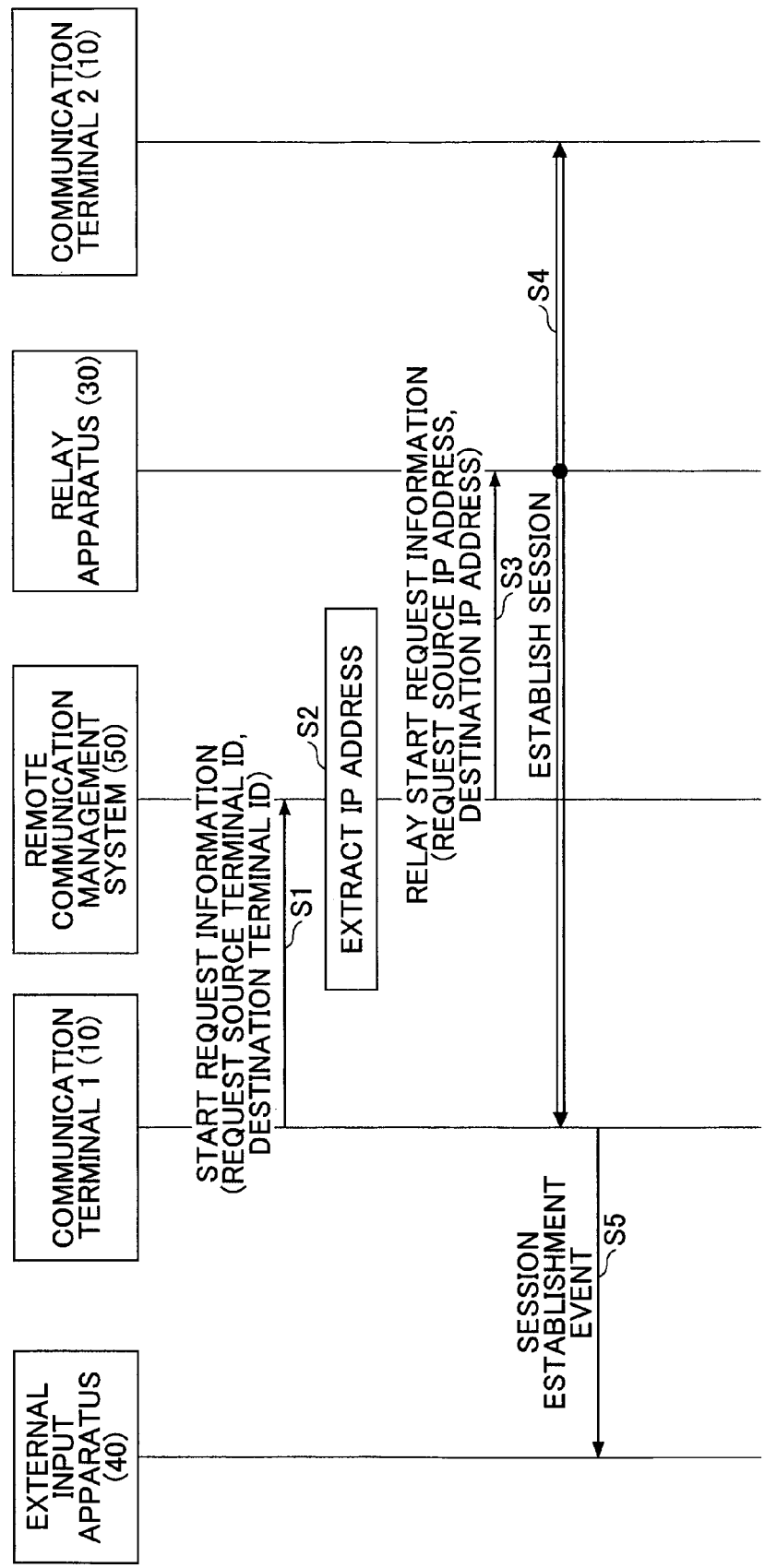

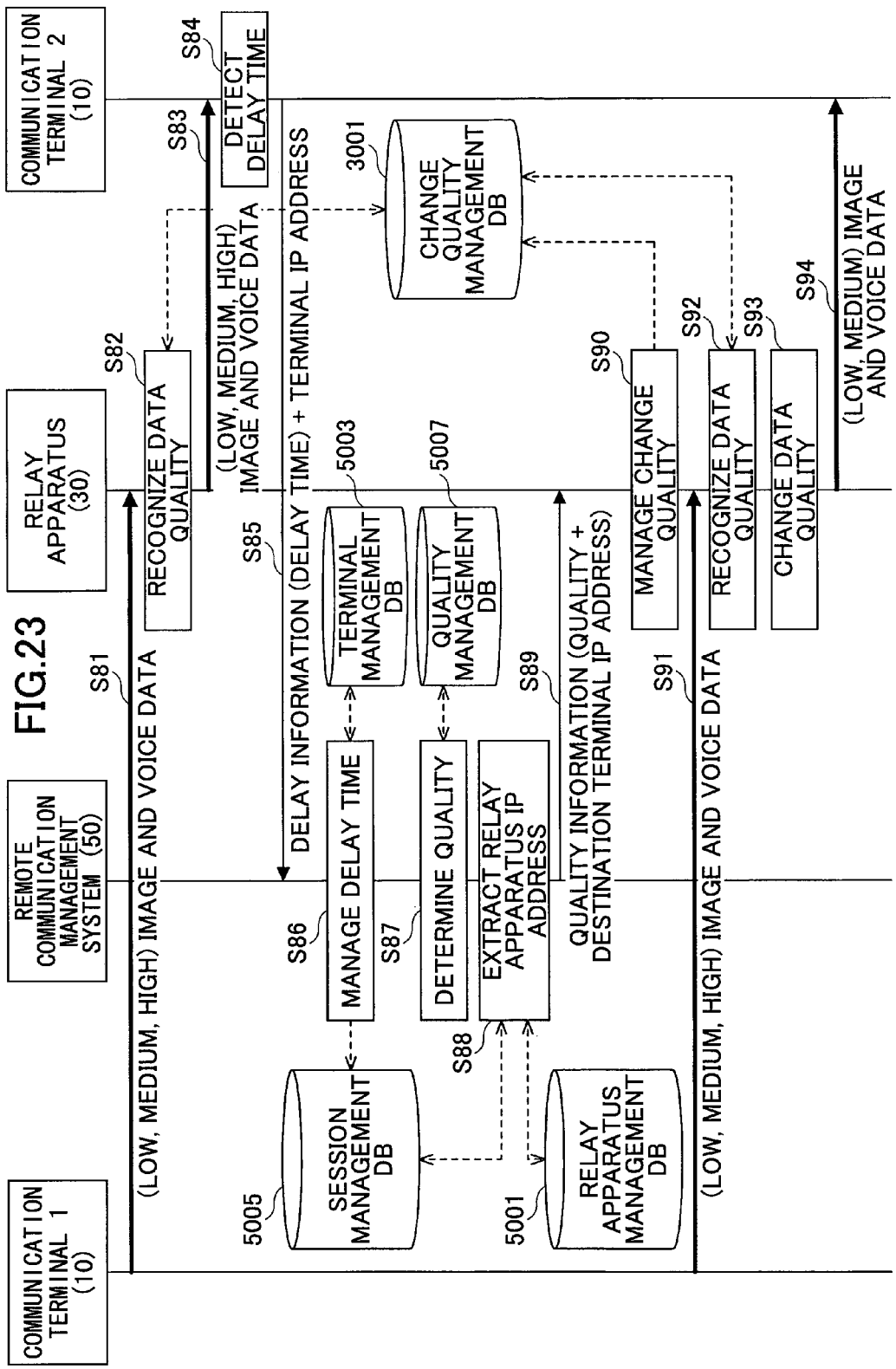

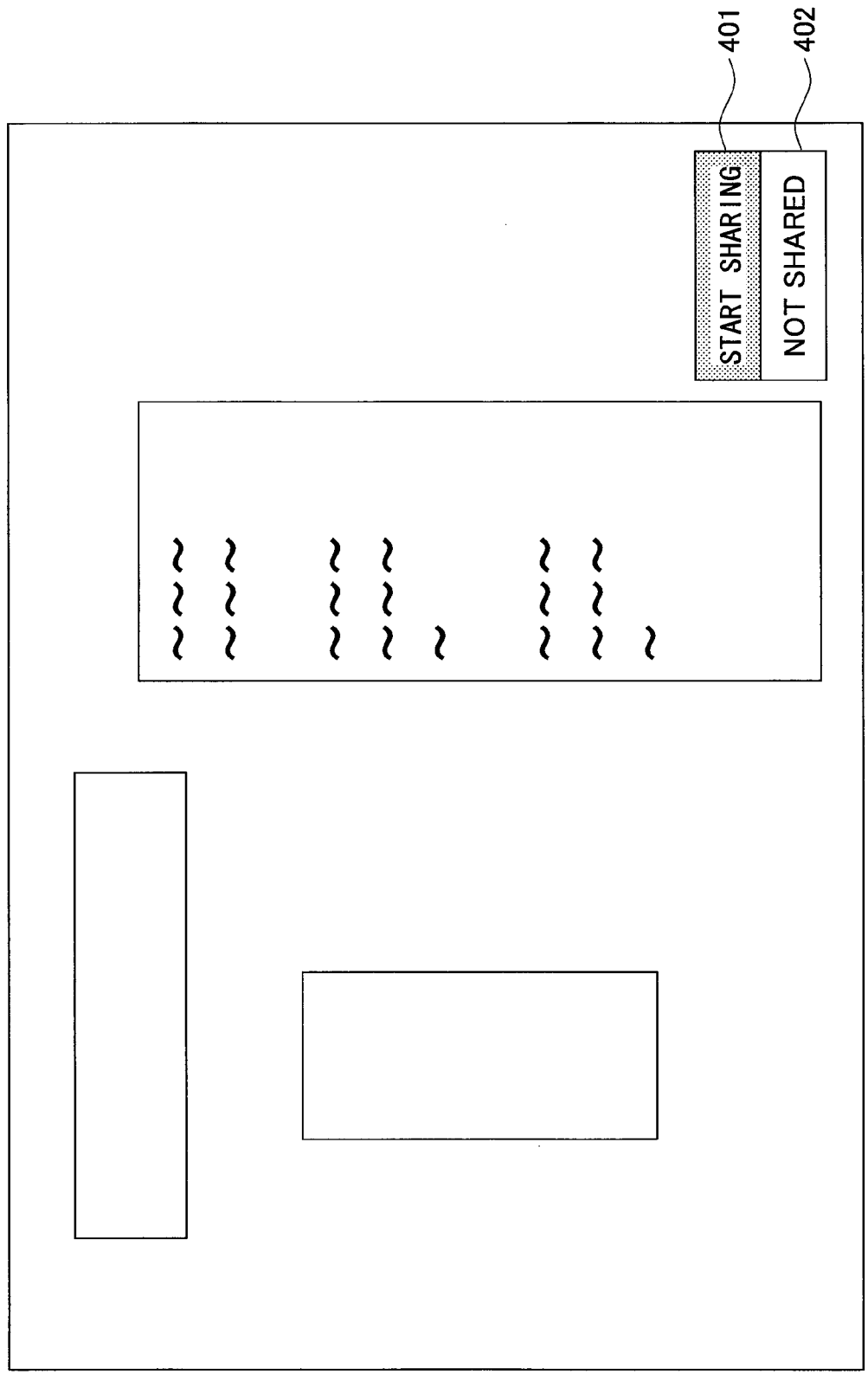

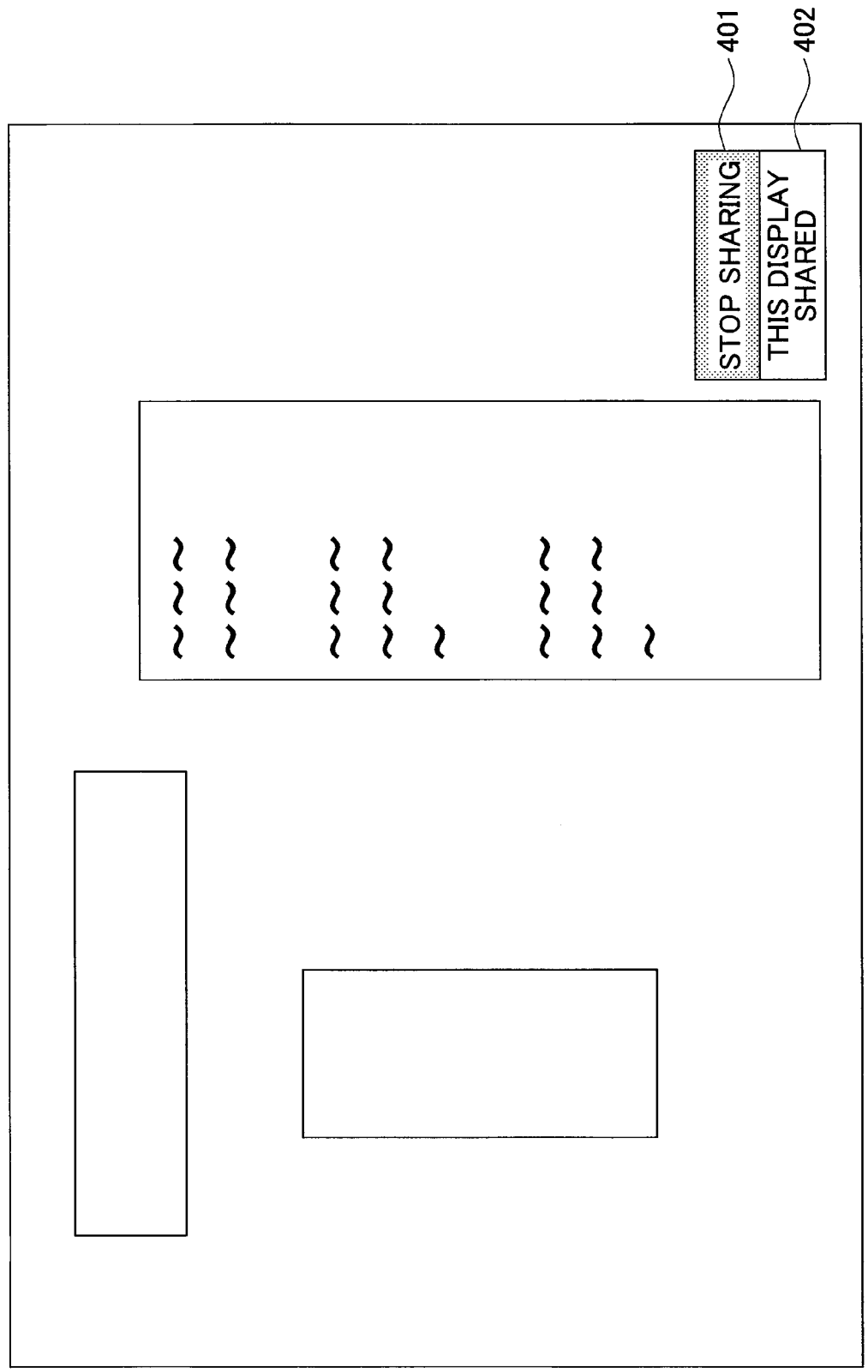

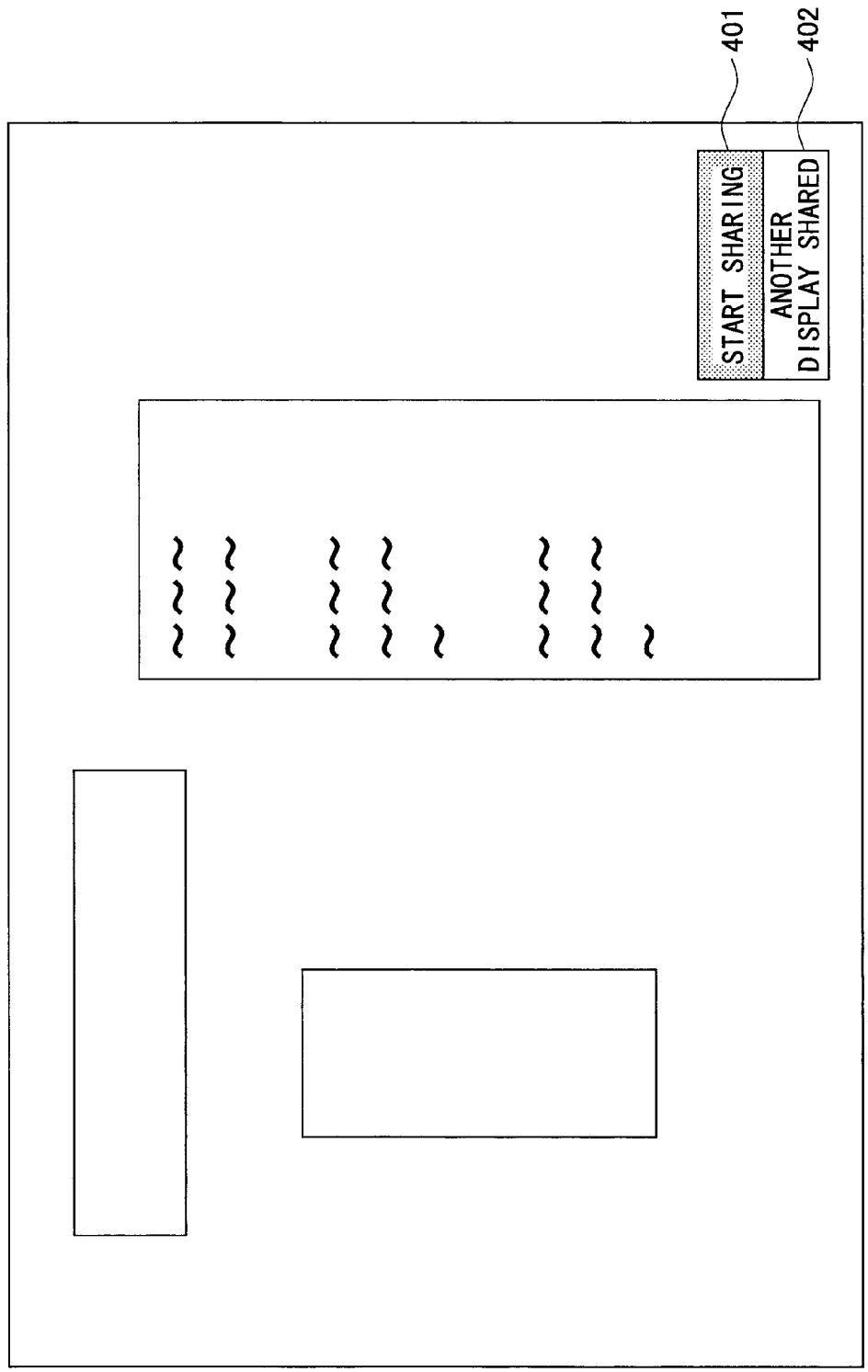

EXTERNAL INPUT APPARATUS, COMMUNICATION TERMINAL, DISPLAY DATA SHARING SYSTEM AND COMPUTER READABLE INFORMATION RECORDING MEDIUM

TECHNICAL FIELD

The present invention relates to an external input apparatus which transmits display data for an image in a remote communication system in which communication is carried out between remote locations, and in particular, to an external input apparatus and so forth with which the display data can be shared by respective locations.

BACKGROUND ART

Along with the spread and improvement in data transmission rates of communication networks such as the Internet, a remote communication system by which a TV conference is carried out between remote locations has come into use. By using the remote communication system, it is possible to reduce business trip costs and business trip man-hours.

In the remote communication system by which a TV conference can be carried out, image data and voice data are transmitted between plural remote communication terminals directly or using a server. Thanks to recent fullness of the broadband environment, transmission of image data with high image quality and voice data with high sound quality becomes possible. Thereby, a situation of another person in a TV conference becomes able to be easily understood, and it becomes possible to understand each other by conversation at a high level.

By using such a remote-communication system, not only voice data and image data but also display data of material used for a conference is transmitted to another person in the conference by using a certain apparatus (for example, an external input apparatus) in some cases. Because of transmitting the display data of the material, another person in the conference can see the same material as that of this side (for example, see U.S. Pat. No. 6,760,749).

However, as the number of remote communication terminals being used in a TV conference increases, the number of sets of material to be shared by the respective remote communication terminals increases. As for this point, according to U.S. Pat. No. 6,760,749, material to be displayed is selected as a result of conference participants selecting the material to be displayed from among plural sets of material by designating corresponding URLs (Uniform Resource Locators).

However, if a user needs to select material to be displayed on a remote communication terminal, operating performance may be degraded. For example, at each time when a certain user switches material, another user needs to designate the material by using the URL, and display the material on the own remote communication terminal.

On the other hand, when all of the sets of material which are sharable and the sets of material which are likely to become targets of discussion are displayed on the display device of the remote communication terminal after reducing the sizes or using the respective windows, a display area for each set of material is reduced in size or the display areas are overlapped and thus, viewing ability may be degraded. Further, it may become difficult for each user to determine which one of the sets of material is the target of the current discussion.

SUMMARY OF INVENTION

According to an embodiment of the present invention, an external input apparatus, connected with a communication terminal which delivers conference data including voice or video to another set of equipment connected via a network, includes a first display part configured to display an image; an operation reception part configured to receive a user's operation; an image obtaining part configured to obtain image data of the image; an image data transmission part configured to transmit the image data to another set of equipment using the communication terminal; a transition information storage part configured to register, according to display control information delivered by the communication terminal, a transition condition of a share menu which is used for receiving a sharing control operation for the image data; and a menu control part configured to display by using the first display part the share menu determined according to the display control information obtained from the communication terminal and the transition condition.

Other objects, features and advantages of the present invention will become more apparent from the following detailed description when read in conjunction with the accompanying drawings.

BRIEF DESCRIPTION OF DRAWINGS

FIG. 3 shows one example of a hardware configuration of a remote communication management system;

FIG. 5 shows one example of a functional block diagram of an external input apparatus;

FIG. 6 shows one example of a material management table;

FIG. 7 shows one example of a change quality management table;

FIG. 8 shows one example of a relay apparatus management table;

FIG. 9 shows one example of a terminal authentication management table;

FIG. 10 shows one example of a terminal management table;

FIG. 11 shows one example of a destination list management table;

FIG. 12 shows one example of a session management table;

FIG. 13 shows one example of an address priority management table;

FIG. 14 shows one example of a transmission rate priority management table;

FIG. 15 shows one example of a quality management table;

FIG. 16 shows one example of an arrangement information management table;

FIG. 18 shows one example of arrangement information and one example of a relationship of video data and display data allocated to respective areas 1, 2, 3 and 4;

FIG. 20 shows one example of events transmitted from a relay apparatus, and one example of correspondence between share flags set by an arrangement information selection part according to the events and display control flags determined by a display data control part;

FIGS. 21A and 21B show one example illustrating of a transition of a display device menu;

FIG. 22 shows one example of a flowchart of a process of establishing a session by communication terminals;

FIG. 23 shows one example of a sequence diagram of a process of transmitting image data and voice data between the communication terminals;

FIGS. 28A, 28B, 28C and 28D show one example of a menu displayed on the external input apparatus;

DESCRIPTION OF EMBODIMENT

Figure 1:
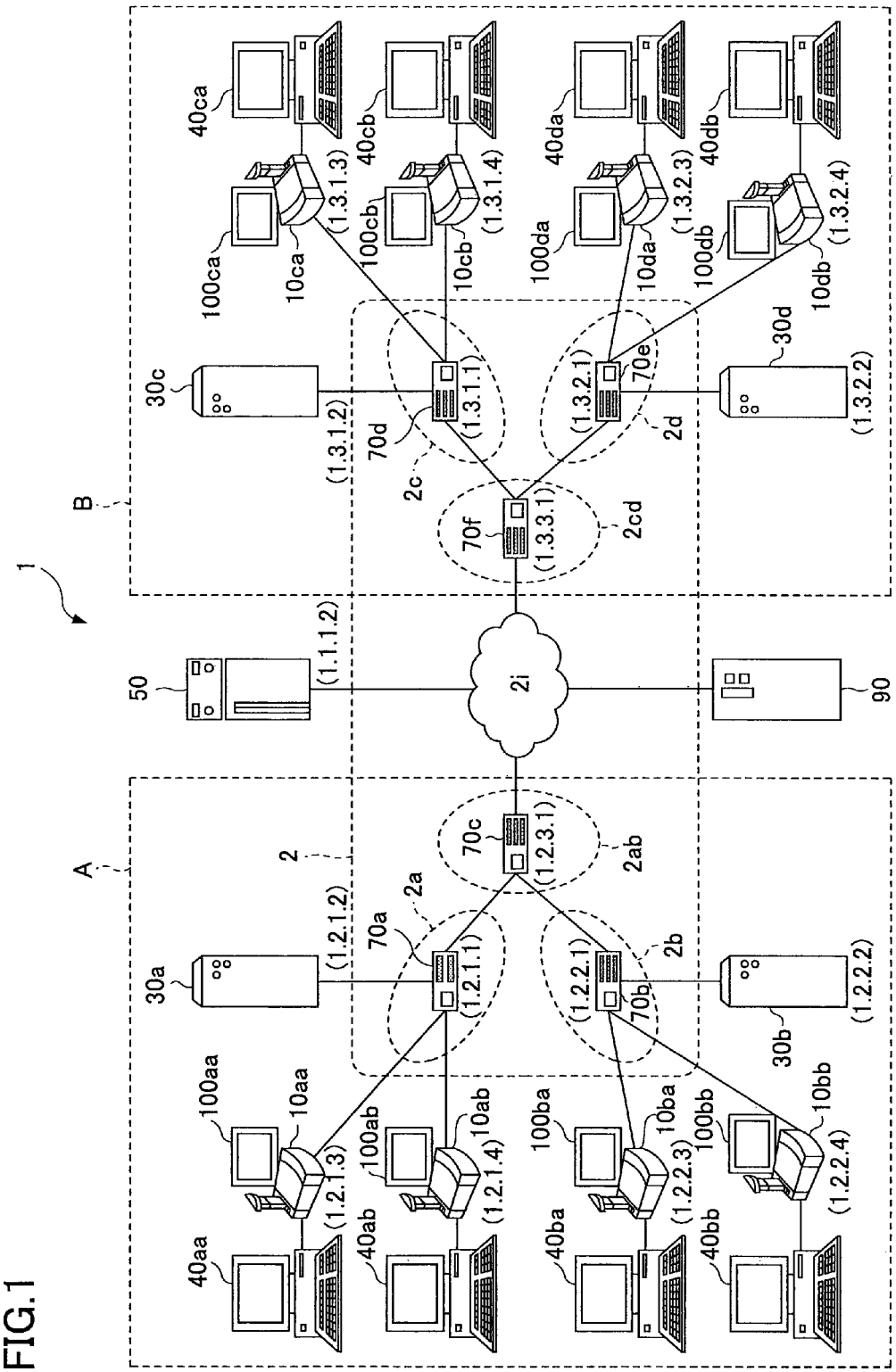
FIG. 1 shows one example of a configuration of a remote communication system.

Below, an embodiment of the present invention will be described with reference to figures.

According to the embodiment of the present invention, it is possible to provide an external input apparatus whereby it is possible to select and display a suitable image without need of a user's operation or by a reduced amount of a necessary procedure while viewing ability of the image displayed on a display device of a remote communication terminal is ensured.

General features of a remote communication system 1 according to the embodiment of the present invention are as follows:

(1) Each of external input apparatuses 1 and 2 (external input apparatuses 40) positioned at two different locations displays a menu for starting sharing of display data of material on a corresponding display device, and each of the external input apparatuses 1 and 2 (external input apparatuses 40) can deliver the display data. On the other hand, for example, when a communication terminal 1 (communication terminal 10) connected with the external input apparatus 1 (external input apparatus 40) receives an event notification indicating that delivering of display data will be started from the external input apparatus 2 (external input apparatus 40) via a relay apparatus, the external input apparatus 1 (external input apparatus 40) stops transmission of the display data having been transmitted until then, and displays the menu for starting sharing of display data again. Further, the communication terminal 1 (communication terminal 10) displays the display data received from the external input apparatus 2 (external input apparatus 40).

Accordingly, it is possible to limit display data to be shared and displayed at the communication terminal 1 to one set of display data, and the participant of a TV conference does not need to select one of plural sets of display data.

(2) Further, in response to an event notification, each of the external input apparatuses 1 and 2 (external input apparatuses 40) displays a message indicating a sharing state of display data. Thereby, a participant can understand a state of display data displayed at the communication terminals 1 and 2 (communication terminals 10) being shared.

(3) Further, in response to an event notification from a relay apparatus, the communication terminals 1 and 2 (communication terminals 10) may dispose video data or display data on a single screen in a manner of emphasizing (magnifying) the video data or the display data. Therefore, it is possible to indicate that the video data or the display data is one to be paid attention to without need of a participant's operation of switching between the video data and the display data.

[Configuration]

FIG. 1 shows one example of a configuration of the remote communication system 1 according to the embodiment of the present invention. In the remote communication system 1, as an example, the communication terminals 10 are disposed to be distributed into an area A and an area B. However, remote communication may be carried out when a minimum of two communication terminals 10 exist.

The remote communication system 1 includes plural communication terminals (10*aa*, 10*ab*, ..., 10*db*), display devices (100*aa*, 100*ab*, ..., 100*db*) for the respective communication terminals (10*aa*, 10*ab*, ..., 10*db*), plural relay apparatuses (30*a*, 30*b*, 30*c* and 30*d*), a remote communication management system 50, a program providing system 90 and external input apparatuses (40*aa*, 40*ab*, ..., 40*db*).

It is noted that in a case of indicating any communication terminal of the plural communication terminals (10*aa*, 10*ab*, ..., 10*db*), an expression of "communication terminal 10" may be used. In a case of indicting any display device of the plural display devices (100*aa*, 100*ab*, ..., 100*db*), an expression of "display device 100" may be used. In a case of indicating any one of the plural relay apparatuses (30*a*, 30*b*, 30*c* and 30*d*), an expression of "relay apparatus 30" may be used. In a case of indicating any one of the plural external input apparatuses (40*aa*, 40*ab*, ..., 40*ab*), an expression of "external input apparatus 40" may be used.

The communication terminal 10 transmits and receives image data, voice data and so forth to and from another communication terminal 10. Although a case will be described where images of image data (obtained by a CCD (Charge Coupled Device) 112, for example) are video (moving images), images of image data may be static images. Further, images of image data may include both video (moving images) and static images. The relay apparatus 30 relays image data and voice data between plural communication terminals 10. The remote communication management system 50 manages, in a unifying manner, the communication terminals 10 and the relay apparatuses 30.

The external input apparatus 40 is connected with the corresponding communication terminal 10, and transmits display data for displaying material data, to the communication terminal 10. The material data means, for example, data produced using document composition software, spreadsheet software, presentation software (i.e., software used for presentation) or such.

Plural routers (70a, 70b, ..., 70g) shown in FIG. 1 select optimum paths for the image data and voice data. It is noted that hereinafter, in a case of indicating any one of the plural routers (70a, 70b, ..., 70f), an expression of "router 70" may be used.

A program providing system 90 includes a HD (Hard Disk) (not shown) storing a program for each of the communication terminals 10 to carry out various functions or causing each of the communication terminals 10 to function as various functional parts, and is capable of transmitting the program to each of the communication terminals 10. Further, the HD of the program providing system 90 also stores a program for each of the relay apparatuses 30 to carry out various functions or causing each of the relay apparatuses 30 to function as various functional parts, and capable of transmitting the program to each of the relay apparatuses 30. Further, the HD of the program providing system 90 also stores a program for remote communication management to carry out various functions or causing the remote communication management apparatus 50 to function as various functional parts, and is capable of transmitting the program for remote communication management to the remote communication management apparatus 50.

The communication terminals 10aa, 10ab, the relay apparatuses 30a and the router 70a are connected together by a LAN 2a in such a manner that they can carry out mutual communication. The communication terminals 10ba, 10bb, the relay apparatus 30b and the router 70b are connected together by a LAN 2b in such a manner that they can carry out mutual communication. The LAN 2a and the LAN 2b are connected together by a private line 2ab including the router 70c in such a manner that they can carry out mutual communication, and are built in the certain area A. For example, the area A is Japan, the LAN 2a is built in any company in Tokyo, and the LAN 2b is built in any company in Osaka.

On the other hand, the communication terminals 10ca, 10cb, the relay apparatus 30c and the router 70d are connected together by a LAN 2c in such a manner that they can carry out mutual communication. The communication terminals 10da, 10db, the relay apparatuses 30d and the router 70e are connected together by a LAN 28d in such a manner that they can carry out mutual communication. The LAN 2c and the LAN 2d are connected together by a private line 2cd including the router 70f in such a manner that they can carry out mutual communication, and are built in a certain area B. For example, the area B is the USA, the LAN 2c is built in any company in New York, and the LAN 2d is built in any company in Washington, D.C.

The area A and the area B are connected together in such a manner that they can carry out mutual communication by the Internet 2i using the routers (70c and 70f), respectively.

Further, the remote communication management system 50 and the program providing system 90 are connected with the communication terminals 10 and the relay apparatuses 30 in such a manner that they can carry out mutual communication by the Internet 2i. The remote communication management system 50 and the program providing system 90 may be installed in the area A or the area B, or may be installed in another area.

It is noted that in the embodiment, the communication network 2 includes the LAN 2a, the LAN 2b, the private line 2ab, the Internet 2i, the private line 2cd, the LAN 2c and the LAN 2d.

Further, in FIG. 1, four numerals below each of the communication terminals 10, the relay apparatuses 30, the remote communication management system 50 and the routers 70 show an IP address according to the common IPv4 in a simplified manner. For example, the IP address of the communication terminal 10aa is "1.2.1.3". IPv6 may be used instead of IPv4. However, for the purpose of simplifying the description, the description will be made using IPv4.

<<Hardware Configuration>>

Next, hardware configurations of each of the sets of equipment will be described. Below, in the description of the embodiment, in a case where a delay occurs in reception of image data at the communication terminal 10 as a relay destination, the relay apparatus 30 changes resolution of the image of the image data and then transmits the image data to the communication terminal 10.

Figure 2:
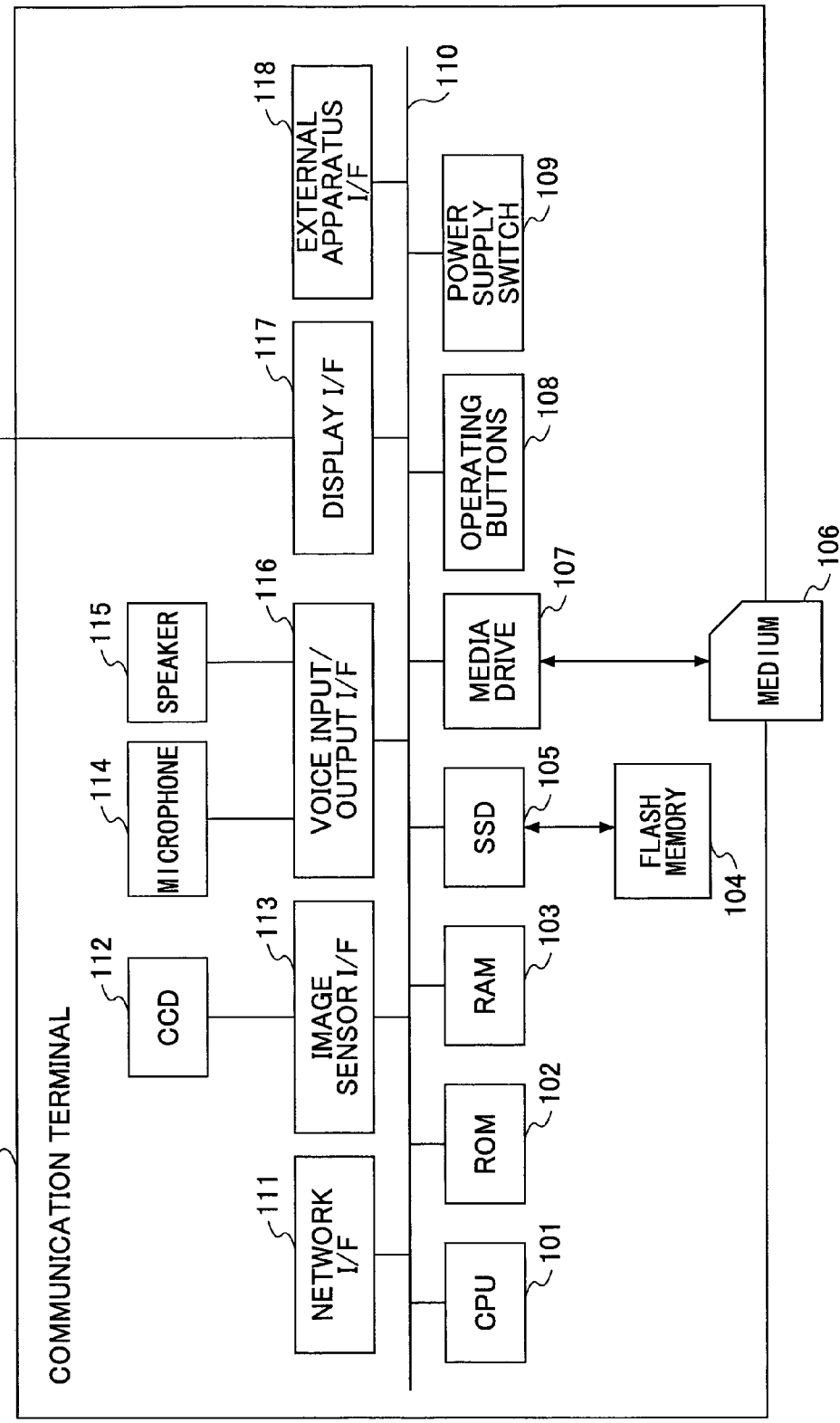
FIG. 2 shows one example of a hardware configuration of a communication terminal.

FIG. 2 shows a hardware configuration of the communication terminal 10 according to the embodiment. As shown in FIG. 2, the communication terminal 10 according to the embodiment includes a CPU (Central Processing Unit) 101 controlling operations of the entirety of the communication terminal 10; a ROM (Read Only Memory) 102 storing a program for the communication terminal 10; a RAM (Random Access Memory) 103 used as a work area of the CPU 101; and a flash memory 104 storing various data such as image data and voice data. The communication terminal 10 according to the embodiment further includes a SSD (Solid State Drive) 105 controlling reading and writing various data from and to the flash memory 104 according to the control of the CPU 101; a media drive 107 controlling reading and writing (recording) data from and to a recording medium 106 such as a flash memory; the operating buttons 108 operated by the user in a case where the user selects a destination of the communication terminal 10 or so; a power supply switch 109 for switching on and off of the power supply in the communication terminal 10; a network I/F (InterFace) 111 for transmitting data using the communication network 2; the CCD 112 photographing an object and obtaining image data according to the control of the CPU 101; an image sensor I/F 113 controlling driving the CCD 112; a microphone 114 inputting voice; a speaker 115 outputting voice; a voice input/output I/F 116 processing input and output of voice signals from the microphone 114 and to the speaker 115 according to the control of the CPU 101; a display I/F 117 transmitting image data to the display device 100 provided in the outside according to the control of the CPU 101; an external apparatus I/F 118 for connecting various types of external apparatuses; and a bus line 110 such as an address bus, a data bus and so forth for electrically connecting the above-mentioned various elements/components as shown in FIG. 2.

It is noted that the recording medium 106 is configured to be detachable with respect to the communication terminal 10. Further, as long as it is a non-volatile memory for which reading and writing can be carried out according to the control of the CPU 101, the flash memory 104 is not limiting, and instead, an EEPROM (Electrically Erasable Programmable ROM) or such may be used. Further, the CCD 112 is a solid state image sensing device which converts light into electric charges, and obtains an electric signal from an image (video) of an object. The CCD 112 is not limiting, as long as it is used for photographing an object, and a CMOS (Complementary Metal Oxide Semiconductor) device or such may be used instead. Further, the display device 100 is made of a liquid crystal or an organic electroluminescence (EL) material or such displaying an image (video) of an object, icons used for operations by the user, and so forth.

Further, the program for the communication terminal 10 may be recorded in a form of a file in an installable or executable type in a computer readable information recording medium, such as the recording medium 106, and may then be circulated.

FIG. 3 shows one example of a hardware configuration of the remote communication management system 50 according to the embodiment. The remote communication management system 50 includes a CPU 201 controlling operations of the entirety of the remote communication management system 50; a ROM 202 storing a program for remote communication management; a RAM 203 used as a work area of the CPU 201; a HD (hard disk) 204 storing various data; an HDD (Hard Disk Drive) 205 controlling reading and writing of the various data from and to the HD 204 according to the control of the CPU 201; a medium drive 207 controlling reading and writing (recording) of data from and to a recording medium 206 such as a flash memory; a display device 208 displaying various sorts of information such as a cursor, a menu, a window, characters/letters (text) and an image; a network I/F 209 for carrying out data transmission using the communication network 2; a keyboard 211 including plural keys for the user to input characters/letters, numerical values, various instructions and so forth; a mouse 212 for the user to select or start execution of various instructions, select a target to process, move the cursor or so; a CD-ROM drive 214 controlling reading various data from a CD-ROM (Compact Disc Read Only Memory) 213 as an example of a detachable recording medium; an external apparatus I/F 215 transmitting and receiving various sorts of data to and from an external apparatus; and a bus line 210 such as an address bus, a data bus and so forth electrically connecting the above-mentioned respective elements/components together as shown in FIG. 3.

It is noted that the program for remote communication management may be recorded in a computer readable recording medium such as the above-mentioned recording medium 206, CD-ROM 213 or such in a form of a file of an installable type or an executable type, and then be circulated.

The external input apparatus 40 has the same hardware configuration as that of the above-mentioned remote communication management apparatus 50, and therefore, the description thereof will be omitted. However, in the ROM 202 of the external input apparatus 40, a program for the external input apparatus 40 for controlling the external input apparatus 40 is recorded. Also in this case, the program for the external input apparatus may be recorded in a computer readable recording medium such as the recording medium 206 or the CD-ROM 213 in a form of a file of an installable type or an executable type, and be circulated.

Further, the relay apparatus 30 has the same hardware configuration as that of the remote communication management apparatus 50, and therefore, the description thereof will be omitted. However, in the ROM 202 of the relay apparatus 30, a program for the relay apparatus for controlling the relay apparatus 30 is recorded. Also in this case, the program for the relay apparatus may be recorded in a computer readable recording medium such as the recording medium 206, a CD-ROM 213 or such in a form of a file of an installable type or an executable type, and be circulated.

Further, the program providing system 90 has the same hardware configuration as that of the remote communication management apparatus 50, and therefore, the description thereof will be omitted. However, in the ROM 202 of the program providing system 90, a program for providing programs is recorded. Also in this case, the program for providing programs may be recorded in a computer readable recording medium such as the recording medium 206, the CD-ROM 213 or such in a form of a file of an installable type or an executable type, and be circulated.

It is noted that each of the above-mentioned programs may be recorded in a computer readable recording medium such as a CD-R (Compact Disc Recordable), a DVD (Digital Versatile Disk) or a Blu-ray Disc as another example of the above-mentioned detachable recording medium, and then be provided.

Figure 4A:
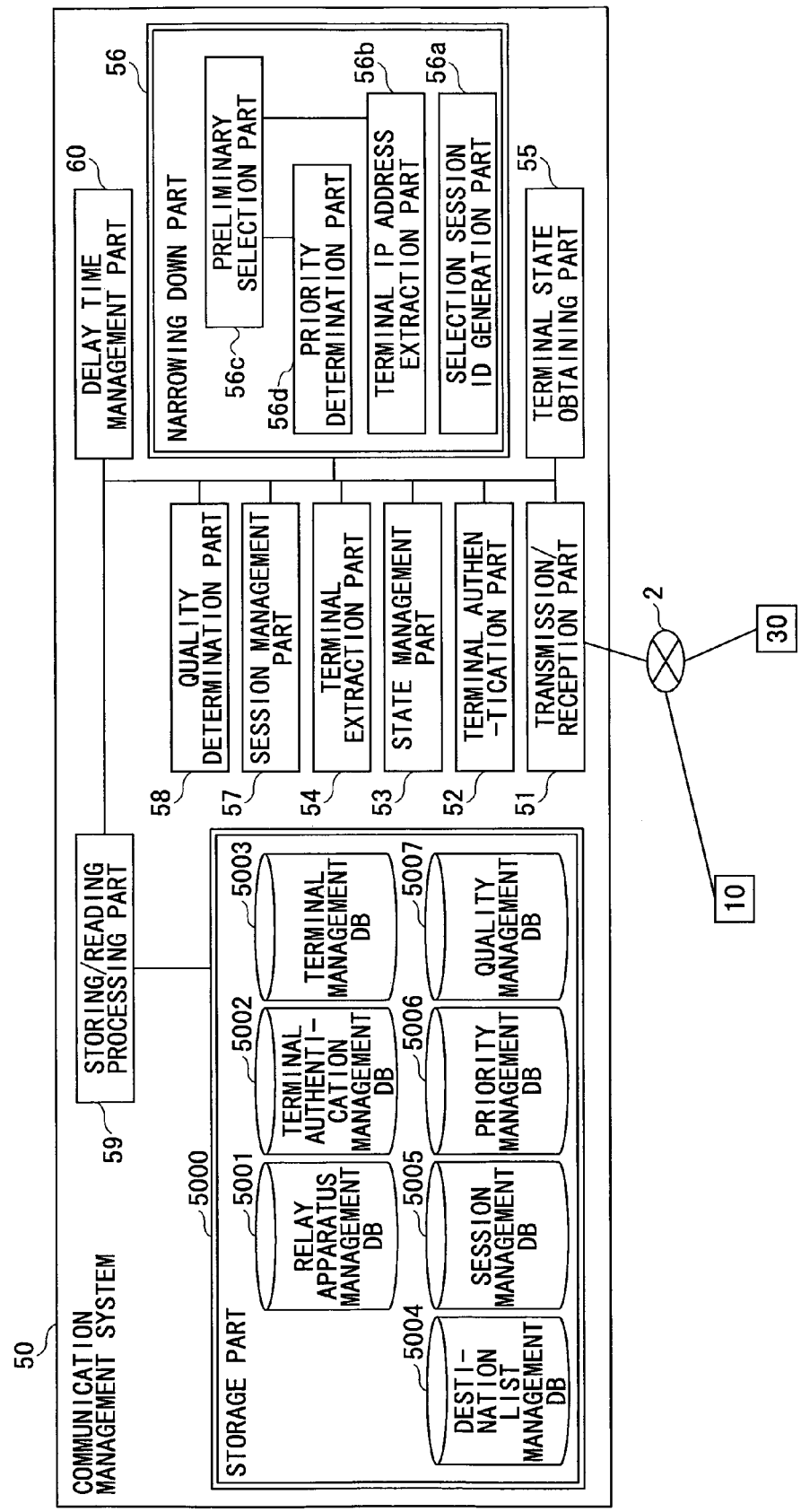
FIGS. 4A and 4B show one example of functional block diagrams of each of terminals, apparatuses and systems included in the remote communication system.
Figure 4B:
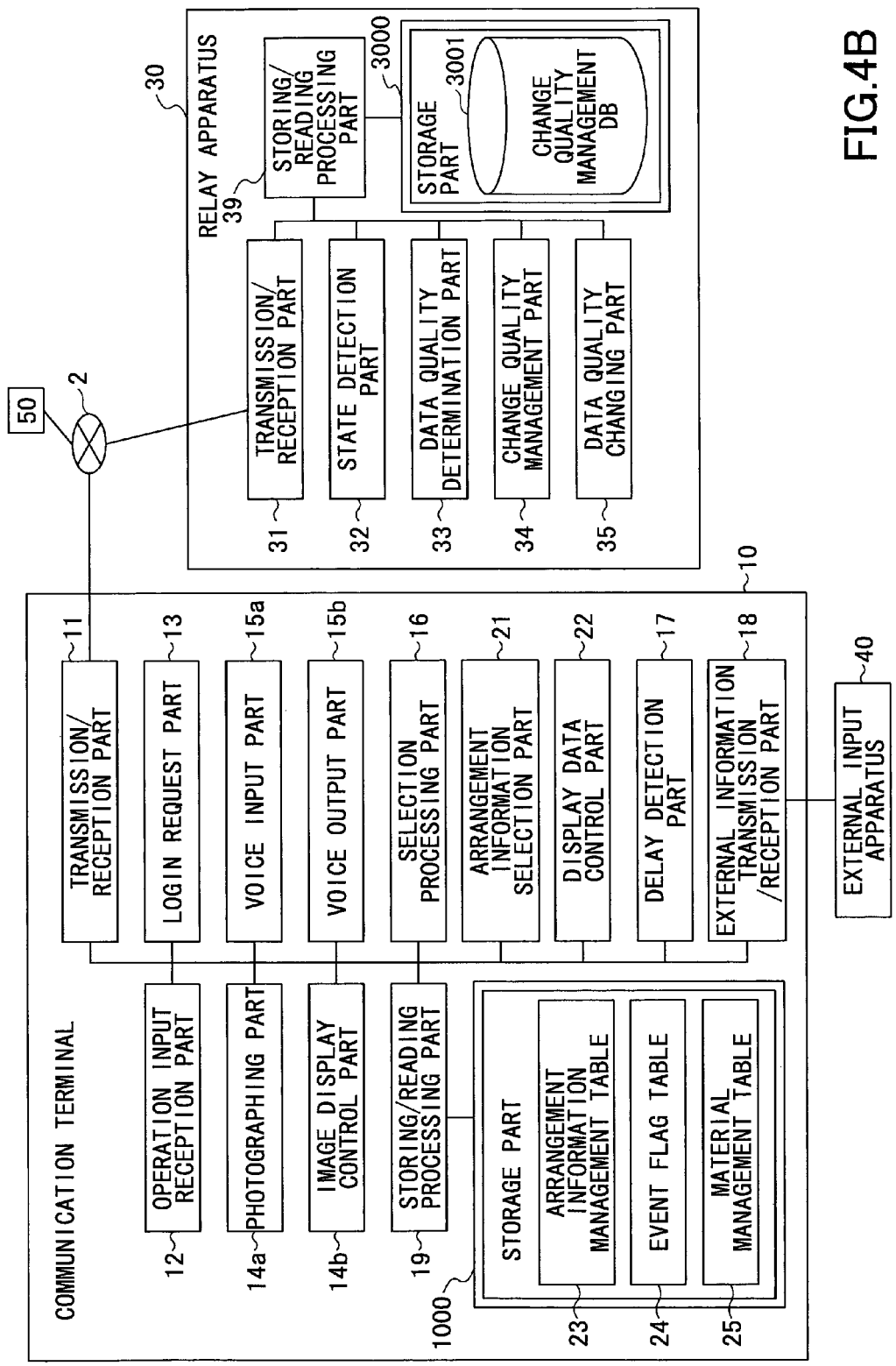

FIGS. 4A and 4B show a functional block diagram of the terminal 10, the apparatus 30 and the system 50 included in the communication system 1 according to the embodiment. In FIGS. 4A and 4B, the communication terminal 10, the relay apparatus 30 and the remote communication management system 50 are connected together by the communication network 2 in such a manner that data communication can be mutually carried out. The external input apparatus 40 is connected with the communication terminal 10 by a USB cable or such so that data communication can be mutually carried out. Since the program providing system 90 shown in FIG. 1 does not directly relate to communication for a TV conference, the program providing system 90 is omitted in FIGS. 4A and 4B. Further, although FIG. 5 is one example of a functional block diagram of the external input apparatus 40, the functional block diagram of the communication terminal shown in FIG. 10 is shown again for the purpose of making description easier.

<Functional Configuration of Communication Terminal>

The communication terminal 10 includes a transmission/reception part 11, an operation input reception part 12, a login request part 13, a photographing part 14a, an image display control part (or a display control part) 14b, a voice input part 15a, a voice output part 15b, a selection processing part 16, a delay detection part 17, an external information transmission/reception part 18, a storing/reading processing part 19, an arrangement information selection part 21 and a display data control part 22. The respective parts correspond to functions or functioning parts realized as a result of the respective elements/components shown in FIG. 2 operating according to instructions given by the CPU 101 that operates according to the program for the communication terminal stored in the ROM 102.

In a case where the communication terminal 10 is connected with the external input apparatus 40, the external input apparatus 40 obtains display data and transmits the display data to the communication terminal 10. When receiving the display data, the communication terminal 10 transmits the display data to the relay apparatus 30 via the communication network 2.

Further, the communication terminal 10 has a storage part 1000 comprising any of the ROM 102, RAM 103 and the flash memory 104 shown in FIG. 2. The storage part 1000 stores an arrangement information management table 23 and an event flag table 24.

(Detailed Functional Configuration of Communication Terminal)

Next, the respective parts of the communication terminal 10 will be described in detail. The transmission/reception part 11 of the communication terminal 10 is realized by the network I/F 111 shown in FIG. 2, and carries out transmission and reception of various sorts of data (information) with another set of equipment such as another communication terminal 10, the relay apparatus 30, the remote communication management system 50 or such via the communication network 2. The operation input reception part 12 is realized by the operating buttons 108 and the power supply switch 109 shown in FIG. 2, and receives various sorts of input operations carried out by the user. For example, when the user turns on the power supply switch 109, the operation input reception part 12 shown in FIG. 4B turns on the power supply in the communication terminal 10 by receiving the user's operation of turning on the power supply switch 109. The login request part 13 is realized by instructions from the CPU 101 shown in FIG. 2, and automatically transmits login request information indicating to request login and the IP address of the communication terminal 10 at the current time to the remote communication management system 50 via the communication network 2 from the transmission/reception part 11 in response to receiving the user's operation of turning on the power supply switch 109.

The photographing part 14a is realized by the CCD 112 and the image sensor I/F 113 shown in FIG. 2, photographs an object, and outputs image data (video data) thus obtained from the photographing. The image display control part 14b is realized by the display I/F 117 shown in FIG. 2, and carries out control to display the image data (video data) on the display device 100 provided on the outside of the communication terminal 10. The image display control part 14b displays, not only video data photographed by the photographing parts 14a of the communication terminal 10 and another communication terminal 10, but also display data that is displayed on the display device 400 of the external input apparatus 40 connected to the communication terminal 10 and captured. The image display control part 14b has a function of controlling display areas for the video data and the display data.

The voice input part 15a is realized by the microphone 114 and the voice input/output I/F 116 shown in FIG. 2, inputs a voice sound of the user, and converts the input voice sound into a voice signal, and outputs voice data corresponding to the voice signal. The voice output part 15b is realized by the speaker 115 and the voice input/output I/F 116 shown in FIG. 2, converts a voice signal corresponding to voice data into voice, and outputs the voice. The voice input part 15a measures the input level of the voice signal, compares the measured input level with a threshold or such, and determines whether a voice signal exists.

The arrangement information selection part 21 gives an instruction of arrangement information for a screen page to be displayed on the display device 100 to the image display control part 14b, by selecting a share flag from the event flag table 24 based on a delivery event for the display data and reading the arrangement information management table 23 using the selected share flag. Details of control using the arrangement information management table 23 and the event flag table 24 will be described later.

The selection processing part 16 carries out a finally narrowing down process of finally narrowing down plural relay apparatuses 30 to select a single relay apparatus 30. The selection processing part 16 measures a reception date and time when advance transmission information is received by the transmission/reception part 11 for each of advance transmission information sets received by the transmission/reception part 11. For each of the advance transmission information sets (corresponding to plural relay apparatuses 30 as candidates, respectively) for which the reception date and time have been measured, the selection processing part 16 calculates a required time from the transmission of the advance transmission information to the reception thereof based on the difference between the measured reception date and time and the transmission date and time included in each of the received advance transmission information sets. The selection processing part 16 selects the relay apparatus 30 by which the advance transmission information has been relayed having the shortest required time from among the calculated required times, and thus, finally selects the single relay apparatus 30.

The delay detection part 17 is realized by instructions from the CPU 101 shown in FIG. 2, and detects a delay time (ms) of image data or voice data sent from another communication terminal 10 via the relay apparatus 30. Further, the external information transmission/reception part 18 transmits and receives data to and from the external input apparatus 40 using the external input apparatus I/F 215. The storing/reading processing part 19 is realized by the SSD 105 shown in FIG. 2, stores various sorts of data in the storage part 1000, and reads various sorts of data stored in the storage part 1000. In the storage part 1000, terminal IDs (Identifications) for identifying the communication terminals 10 and passwords, relay apparatus IDs for identifying the relay apparatuses 30 that transmits image data, voice data and so forth, the IP addresses of destination terminals, and so forth, are stored.

The display data control part 22 obtains the display data of the external input apparatus 40, and transmits the obtained display data to another communication terminal via the relay apparatus 40. The display data is, for example, image data created in a form of JPEG (Joint Photographic Experts Group), Bitmap or such, or rendering commands created in a form of GDI (Graphics Device Interface). The display data may include material data or may correspond to a simple desktop screen page not including material data.

Further, in response to a request from the external input apparatus 40, the display data control part 22 sends a request to start delivery of the display data or a request to stop delivery of the display data to the relay apparatus 30. Further, in response to a delivery event from the relay apparatus 30, the display data control part 22 reads the event flag table 24, determines the state of a display control flag, and transmits the display control flag to the external input apparatus 40. The display control flag will be described later.

It is noted that the terminal IDs and the relay apparatus IDs according to the embodiment indicate identification information such as language, characters/letters, signs or various sorts of marks used for uniquely identifying the remote communication terminals 10 and the relay apparatuses 30, respectively. Further, each of the terminal IDs and the relay apparatus IDs may be identification information that is a combination of at least two of the above-mentioned language, character/letter, sign and various sorts of marks. Further, hereinafter, the remote communication terminal 10 as a request source which requests to start a TV conference may be referred to as a "request source terminal 10A" and the remote communication terminal 10 as a destination as a request destination may be referred to as a "destination terminal 10B".

<Functional Configuration of External Input Apparatus>

As shown in FIG. 5, the external input apparatus 40 includes a transmission/reception part 41, a connection detection part 42, a storage part 43, a display data obtaining part 451, a display data transmission part 452, a menu control part 44, an operation input reception part 46 and a storing/reading processing part 49. The respective parts correspond to functions or functioning parts realized as a result of the respective elements/components shown in FIG. 3 operating according to instructions given by the CPU 201 that operates according to the program for the external input apparatus stored in the ROM 202. Further, the external input apparatus 40 has the display device 400 that is the display device 208 shown in FIG. 3. Further, the external input apparatus 40 has an operating system (OS) such as Windows (registered trademark)

loaded therein, and thereby, has a function of executing the program when being connected with another apparatus.

<Detail Functional Configuration of External Input Apparatus>

Next, each part of the external input apparatus 40 will be described in further detail. The transmission/reception part 41 of the external input apparatus 40 is realized by the network I/F 209 shown in FIG. 3, and transmits and receives various sorts of data (information) to and from the communication terminal 10. The connection detection part 42 detects becoming able to transmit and receive data to and from the communication terminal 10 using the external apparatus I/F 215. The operation input reception part 46 is realized by a keyboard, a mouse and so forth, and receives an input by the user's operation.

The display data obtaining part 451 obtains the display data of the external input apparatus 40 by capturing a screen page of the display device 400 or so. The display data transmission part 452 transmits the display data obtained by the display data obtaining part 451 to the communication terminal 10.

The storing/reading processing part 49 is realized by the HDD 205 shown in FIG. 3 and carries out a process of storing various sorts of data and reading the various sorts of data stored in the storage part 43. The storage part 43 is realized by the HDD 205, and stores a material management table 432, a transition condition table 431 and so forth. The display device 400 is the display device 208, and carries out displaying on the screen. The menu control part 44 causes the display device 400 to display the contents of a menu or a state of sharing (i.e., a sharing state), according to the display control flag.

(Material Management Table)

The material management table 432 is stored in the HDD 205 of the external input apparatus 40.

FIG. 6 shows one example of the material management table 432. In the material management table 432, a material name that is a name of material; a size indicating a size of the material; an application name indicating a name of application software used for creating the material; an updated date and time at which the material has been updated most recently; and material data are associated with each other and are managed.

<Functional Configuration of Relay Apparatus>

Functions and respective parts of the relay apparatus 30 will now be described with reference to FIG. 4B. The relay apparatus 30 includes a transmission/reception part 31, a state detection part 32, a data quality determination part 33, a change quality management part 34, a data quality changing part 35 and a storing/reading processing part 39. These parts correspond to functions or functioning parts realized as a result of the respective elements/components shown in FIG. 3 operating according to instructions given by the CPU 201 that operates according to the program stored in the ROM 202. Further, the relay apparatus 30 has a storage part 3000 comprising the HDD 204 shown in FIG. 3.

(Change Quality Management Table)

In the storage part 3000, a change quality management DB (DataBase) 3001 including a change quality management table such as that shown in FIG. 7 is stored. In the change quality management table, the IP address of the communication terminal 10 as a relay destination of image data and the image quality of the image data relayed by the relay apparatus 30 to the relay destination are associated with one another and are managed.

As to resolution, for example, there are an image of low resolution as a base image having a configuration of 160 pixels (in a horizontal direction) by 120 pixels (in a vertical direction), an image of medium resolution having a configuration of 320 pixels (in the horizontal direction) by 240 pixels (in the vertical direction), and an image of high resolution having a configuration of 640 pixels (in the horizontal direction) by 480 pixels (in the vertical direction). Thereamong, in a case where a narrow band path is used, image data of low image quality including only image data of low resolution as a base image is relayed. In a case where a band is relatively wide, image data of medium image quality including image data of low resolution as a base image and image data of medium resolution is relayed. In a case where a band is very wide, image data of high image quality including image data of low resolution as a base image, image data of medium resolution and image data of high resolution is relayed. For example, in the change quality management table shown in FIG. 7, in a case where the relay apparatus 30 relays the image data to the destination terminal 10*db* of the IP address "1.3.2.4", the image quality (quality of an image) of the image data is "high quality" (high image quality).

(Detailed Functional Configuration of Relay Apparatus)

Next, the functional configuration of each of parts/components included in the relay apparatus 30 will be described in detail. It is noted that below, along with describing the functional configuration of the relay apparatus 30, relationships with main elements/components, from among those shown in FIG. 3, used for realizing the functional configuration of the relay apparatus 30, will be also described.

The transmission/reception part 31 of the relay apparatus 30 shown in FIG. 4B is realized by the network I/F 209 shown in FIG. 3, and carries out transmission and reception of various sorts of data (information) with another set of equipment such as the communication terminal 10, another relay apparatus 30, the remote communication management system 50 or such via the communication network 2. The state detection part 32 is realized by instructions from the CPU 201 shown in FIG. 3, and detects an operating state of the relay apparatus 30 having this state detection part 32. The operating state may be a state of "on-line", "off-line", or "in failure".

The data quality determination part 33 is realized by instructions from the CPU 201 shown in FIG. 3, searches the change quality management DB 3001 (see FIG. 7) using the IP address of the destination terminal 10B as a search key, extracts the image quality of the corresponding image data to be relayed, and thus recognizes the image quality of the image data to be relayed. The change quality management part 34 is realized by instructions from the CPU 201, and changes the contents of the change quality management DB 3001 based on quality information (described later) which is sent from the remote communication management system 50. For example, a case will be supposed in which a TV conference is being conducted between a request source terminal (10*aa*) having the terminal ID "01*aa*" and a destination terminal (10*db*) having the terminal ID "01*db*" where image data of high image quality is mutually transmitted, and a delay in receiving the image data occurs in the destination terminal (10*db*) because another request source terminal (10*bb*) and another destination terminal (10*ca*) have started another TV conference using the same communication network 2, for example. In such a case, the relay apparatus 30 needs to reduce the image quality of the image data, being relayed by the relay apparatus 30 itself, from the high image quality to the medium image quality. In such a case, based on the quality information indicating this medium image quality, the contents of the change quality managemerit DB 3001 are changed so that the image quality of the image data which the relay apparatus 30 is relaying will be reduced from the high image quality to the medium image quality.

The data quality changing part 35 is realized by instructions from the CPU 201, and changes the image quality of the image data sent from the transmission source terminal 10 based on the contents of the change quality management DB 3001 changed as mentioned above. The storing/reading processing part 39 is realized by the HDD 205 shown in FIG. 3, and carries out processing of recording various sorts of data in the storage part 3000 and reading various sorts of data stored in the storage part 3000.

<Functional Configuration of Remote Communication Management System>

Next, functions or functional parts of the remote communication management system 50 will be described. The remote communication management system 50 includes a transmission/reception part 51, a terminal authentication part 52, a state management part 53, a terminal extraction part 54, a terminal state obtaining part 55, a narrowing down part 56, a session management part 57, a quality determination part 58, a storing/reading processing part 59 and a delay time management part 60. These parts correspond to functions or functioning parts realized as a result of the respective elements/components shown in FIG. 3 operating according to instructions given by the CPU 201 that operates according to the program for remote communication management stored in the ROM 202. Further, the remote communication management system 50 has a storage part 5000 comprising the HD 204 shown in FIG. 3.

(Relay Apparatus Management Table)

In the storage part 5000, a relay apparatus management DB 5001 including a relay apparatus management table such as that shown in FIG. 8 is stored. In the relay apparatus management table, for the relay apparatus ID of each of the relay apparatuses 30, the operating state of the relay apparatus 30, the reception date and time when state information indicating the operating state has been received by the remote communication management system 50, the IP address of the relay apparatus 30 and the maximum data transmission rate (Mbps) in the relay apparatus 30 are associated with each other and are managed. For example, in the relay apparatus management table shown in FIG. 8, it is indicated that the relay apparatus 30a having the relay apparatus ID "111a" has the operating state of "on-line", the date and time when the state information has been received in the remote communication management system 50 are "Nov. 10, 2009, 13:00", the IP address of the relay apparatus 30a is "1.2.1.2", and the maximum data transmission rate in the relay apparatus 30a is 100 Mbps.

(Terminal Authentication Management Table)

Further, in the storage part 5000, a terminal authentication management DB 5002 including a terminal authentication management table such as that shown in FIG. 9 is stored. In the terminal authentication management table, respective passwords are associated with the terminal IDs of all the communication terminals 10 managed by the remote communication management system 50 and are managed. For example, in the terminal authentication management table shown in FIG. 9, it is indicated that the terminal ID of the terminal 10aa is "01aa", and the password is "aaaa".

(Terminal Management Table)

Further, in the storage part 5000, a terminal management DB 5003 including a terminal management table such as that shown in FIG. 10 is stored. In the terminal management table, for the terminal ID of each of the communication terminals 10, the operating state of the communication terminal 10, the reception date and time when login request information (described later) has been received by the remote communication management system 50, and the IP address of the communication terminal 10 are associated with each other and are managed. For example, in the terminal management table shown in FIG. 10, it is indicated that the communication terminal 10aa having the terminal ID "01aa" has the operating state "on-line", the reception date and time when the login request information has been received in the remote communication management system 50 is "Nov. 10, 2009, 13:40", and the IP address of the communication terminal 10aa is "1.2.1.3".

(Destination List Management Table)

Further, in the storage part 5000, a destination list management DB 5004 including a destination list management table such as that shown in FIG. 11 is stored. In the destination list management table, for the terminal ID of a request source terminal 10A which requests to start a TV conference, all of the terminal IDs of the destination terminals 10B registered as candidates for a destination terminal 10B are associated and are managed. For example, in the destination list management table shown in FIG. 11, it is indicated that the candidates for a destination terminal 10B for which the request source terminal (10aa) can request to start of a TV conference are three, i.e., the communication terminal 10ab having the terminal ID "01ab", the communication terminal 10ba having the terminal ID "01ba" and the communication terminal 10db having the terminal ID "01db". The candidates for a destination terminal 10B are updated as a result of addition or deletion according to a request of addition or deletion from any request source terminal 10A to the remote communication management system 50.

(Session Management Table)

Further, in the storage part 5000, a session management DB 5005 including a session management table such as that shown in FIG. 12 is stored. In the session management table, for each of selection session IDs used for carrying out a session (selection session) for selecting the relay apparatus 30, the relay apparatus ID of the relay apparatus 30 (used for relaying the image data, the voice data and the display data), the terminal ID of the request source terminal 10A, the terminal ID of the destination terminal 10B, a delay time (ms) (of reception when the image data is received at the destination terminal 10B), and the reception date and time (at which delay information indicating the delay time has been transmitted from the destination terminal 10B and received by the remote communication management system 50) are associated with each other and managed. For example, in the session management table shown in FIG. 12, it is indicated that the relay apparatus 30a (the relay apparatus ID "111a") selected by the session executed using the selection session ID "sel" is relaying image data and voice data between the request source terminal (10aa) of the terminal ID "01aa" and the destination terminal (10db) of the terminal ID "01db", and the delay time of the image data is 200 ms at the time of "Nov. 10, 2009, 14:00" at the destination terminal (the terminal 10db). It is noted that in a case where a TV conference is carried out between two communication terminals 10, the reception date and time of the delay information may be managed based on the delay information sent from the request source terminal 10A instead of the above-mentioned destination terminal 10B. However, in a case where a TV conference is conducted between three or more communication terminals 10, the reception date and time of the delay information is managed based on the delay information sent from the communication terminal which is receiving the image data, the voice data and the display data.

(Address Priority Management Table)

Further, in the storage part 5000, a priority management DB 5006 including an address priority management table such as that shown in FIG. 13 is stored. In the address priority management table, differences in four values included in dot addresses of an IP address according to the common IPv4 are associated with a point count of address priority in such a manner that the point count of address priority becomes higher as the number of same dot addresses is larger. For example, in the address priority management table shown in FIG. 13, in a case (on first line) where the IP address has three values of the dot addresses from the highest order toward the lowest order which are the same as each other (i.e., "same-.same.same.diff" in FIG. 13), the point count of the address priority is "5". In a case (on second line) where the IP address has two values of the dot addresses from the highest order toward the lowest order which are the same as each other (i.e., "same.same.diff.-"), the point count of the address priority is "3". In this case, whether the value at the lowest order is the same or different is not relevant to the priority. In a case (on third line) where the IP address has the value of the dot address at the highest order is the same and the second order value is different (i.e., "same.diff.-.-"), the point count of the address priority is "1". In this case, whether the values at the third and last orders from the highest order are the same or different is not relevant to the priority. In a case (on last line) where the IP address has the value of the dot address at the highest order is different (i.e., "diff.-.-.-"), the point count of the address priority is "0". In this case, whether the values at the second, third and last orders from the highest order are the same or different is not relevant to the priority.

(Transmission Rate Priority Management Table)

Further, in the priority management DB 5006 stored in the storage part 5000, a transmission rate management table such as that shown in FIG. 14 is also included. In the transmission rate priority management table, the maximum data transmission rate (Mbps) in the relay apparatus 30 is associated with the point count of priority in such a manner that, as the maximum transmission rate is larger, the point count of transmission rate priority becomes higher.

For example, in the transmission rate priority management table shown in FIG. 14, in a case (on first line) where the maximum transmission rate in the relay apparatus 30 is equal to 1000 Mbps or more, the point count of the transmission rate priority is "5". In a case (on second line) where the maximum transmission rate in the relay apparatus 30 is equal to more than 100 Mbps and less than 1000 Mbps, the point count of the transmission rate priority is "3". In a case (on third line) where the maximum transmission rate in the relay apparatus 30 is equal to more than 10 Mbps and less than 100 Mbps, the point count of the transmission rate priority is "1". In a case (on last line) where the maximum transmission rate in the relay apparatus 30 is less than 10 Mbps, the point count of the transmission rate priority is "0".

(Quality Management Table)

Further, in the storage part 5000, a quality management DB 5007 including a quality management table such as that shown in FIG. 15 is stored. In the quality management table, image quality (quality of an image) of the image data to be relayed by the relay apparatus 30 is associated with the delay time (ms) of the image data in the request source terminal 10A or the destination terminal 10B and is managed. It is noted that, as shown in FIG. 15, in a case where the delay time is more than "500 ms", the communication is considered to be interrupted ("INTERRUPTION") since the delay is too much.

(Detailed Functional Configuration of Remote Communication Management System)

Next, the functional configuration of each of parts/components of the remote communication management system 50 will be described in detail. It is noted that below along with describing the functional configuration of the remote communication management system 50, relationships with main elements/components, from among those shown in FIG. 3, used for realizing the functional configuration of the remote communication management system 50 will be also described.

The transmission/reception part 51 is realized by the network I/F 209 shown in FIG. 3, and carries out transmission and reception of various sorts of data (information) with another set of equipment such as the communication terminal 10, the relay apparatus 30 or such via the communication network 2. The terminal authentication part 52 searches the terminal authentication management DB 5002 of the storage part 5000 using the terminal ID and the password included in the login request information received via the transmission/reception part 51 as search keys, and carries out authentication of the communication terminal 10 by determining whether the same set of the terminal ID and the password is managed in the terminal authentication management DB 5002. The state management part 53, for the purpose of managing the operating state of a request source terminal 10A which has requested to login, stores the terminal ID of the request source terminal 10A, the operating state of the request source terminal 10A, the reception date and time when the login request information has been received in the remote communication management system 50 and the IP address of the request source terminal 10A in the terminal management table (see FIG. 10) in a manner of associating them with each other and manages them.

The terminal extraction part 54 searches the destination list management table (see FIG. 11) using the terminal ID of a request source terminal 10A which has requested to login as a search key, reads the terminal IDs as candidates for a destination terminal 10B which can carry out remote communication with the request source terminal 10A, and extracts the terminal IDs. Further, the terminal extraction part 54 searches the destination list management table using the terminal ID of the request source terminal 10A which has requested to login as a search key, and extracts also the terminal IDs of the other request source terminals 10A each of which has registered the terminal ID of the request source terminal 10A as a candidate for a destination terminal 10B.

The terminal state obtaining part 55 searches the terminal management DB 5003 (see FIG. 10) using the terminal IDs of candidates for a destination terminal 10B extracted by the terminal extraction part 54 as search keys, and reads the operating state of each of the terminal IDs extracted by the terminal extraction part 54. Thereby, the terminal state obtaining part 55 can obtain the operating states of the candidates for a destination terminal 10B which can carry out remote communication with the request source terminal 10A having requested to login. Further, the terminal state obtaining part 55 searches the terminal management table (see FIG. 10) using the terminal ID of the request source terminal having requested to login, and obtains the operating state of the request source terminal 10A having requested to login.

The narrowing down part 56, for the purpose of assisting in a finally narrowing down process of finally narrowing down plural relay apparatuses 30 to select a single relay apparatus 30, and for carrying out a preliminary narrowing down process before the finally narrowing down process, has a selection session ID generation part 56a, a terminal ID obtaining part 56b, a preliminary selection part 56c, and a priority determination part 56d. Thereamong, the selection session ID generation part 56a generates a selection session ID to be used for carrying out a session (selection session) for selecting relay apparatuses 30. The terminal ID obtaining part 56b searches the terminal management table (see FIG. 10) based on the terminal ID of the request source terminal 10A and the terminal ID of the destination terminal 10B from start request information sent from the request source terminal 10A, and extracts the corresponding IP addresses of the respective communication terminals 10. The preliminary selection part 56c selects the relay apparatus IDs of the relay apparatuses having the operating states "on-line" from among the relay apparatuses 30 managed in the relay apparatus management table (see FIG. 8), and thus, selects the relay apparatuses 30 (first selection).

Further, based on the terminal ID of the request source terminal 10A and the terminal ID of the destination terminal 10B obtained by the terminal ID obtaining part 56b, the preliminary selection part 56c searches the relay apparatus management table (see FIG. 8), and thus, determines whether for each of the dot addresses of the IP addresses of the thus-selected (in the above-mentioned first selection) relay apparatuses 30, the respective values of each of the dot addresses of the IP addresses of the above-mentioned request source terminal 10A and the destination terminal 10B are the same. Further, the preliminary selection part 56c further selects the relay apparatuses 30 (second selection) by selecting the top two relay apparatuses 30 having the highest and second highest point counts of priority, respectively, among total point counts obtained from totaling the point counts of the address priority and the point counts of the transmission rate priority, respectively. It is noted that each of the point counts of the address priority used for the totaling is one higher with respect to the corresponding communication terminals 10.

It is noted that according to the embodiment, the top two relay apparatuses 30 having the highest and second highest point counts are selected as mentioned above (in the second selection). However, this way is not limiting, and it is also possible to select the top three or more relay apparatuses 30 having the highest, second highest and third highest point counts or more when the more relay apparatuses 30 are to be selected (in the second selection) from the narrowing down.

The priority determination part 56d reads the address priory management table (see FIG. 13) and determines the above-mentioned point counts of the address priority (to be used for the above-mentioned second selection) for each of the relay apparatuses 30 for which the preliminary selection part 56c has determined whether for the dot addresses of the IP addresses of the thus-selected relay apparatuses 30, the respective values of the dot addresses of the IP addresses of the above-mentioned request source terminal 10A and the destination terminal 10B are the same. Further, the priority determination part 56d searches the transmission rate priory management table (see FIG. 14) based on the maximum data transmission rate of each of the relay apparatuses 30 managed in the relay apparatus management table (see FIG. 8), and determines the above-mentioned point count of the transmission rate priority (to be used for the above-mentioned second selection) for each of the relay apparatuses 30 having been selected (in the above-mentioned first selection) by the preliminary selection part 56c.

The session management part 57 stores the selection session ID generated by the selection session ID generation part 56a, the terminal ID of the request source terminal 10A and the terminal ID of the destination terminal 10B in a manner of associating them with each other in the session management table (see FIG. 12) of the storage part 5000, and manages them. Further, the session management part 57 stores for each of the selection session IDs, the relay apparatus ID of the relay apparatus 30 which has been finally narrowed down to one by the selection processing part 16 of the communication terminal 10 in the session management table (see FIG. 12) and manages them.

The quality determination part 58 searches the quality management table (see FIG. 15) using the above-mentioned delay time as a search key, extracts the image quality of the corresponding image data, and determines the image quality of the image data to be relayed by the relay apparatus 30. The storing/reading processing part 59 is realized by the HDD 205 shown in FIG. 3, stores various sorts of data in the storage part 5000 and reads various sorts of data stored in the storage part 5000. The delay time management part 60 searches the terminal management table (see FIG. 10) using the IP address of the above-mentioned destination terminal 10B, extracts the corresponding terminal ID, and further stores the delay time indicated by the above-mentioned delay information at the field of delay time in the record including the thus-extracted terminal ID in the session management table (see FIG. 12), and manages it.

[Display Control of Display Data]

Below, display control for the display data according to the embodiment will be described in detail.

(Arrangement Information Management Table)

FIG. 16 shows one example of the arrangement information management table 23. In the arrangement information management table 23, information for managing an arrangement of the display data is registered. "Arrangement information No." is identification information for identifying a record. "Arrangement information" is information indicating how to arrange the video data and the display data on the display device 100. The arrangement information includes "VIEW_MULTI" and "SHARED_MULTI". Although fully described later, "VIEW_MULTI" means that only the video data is displayed, and "SHARED_MULTI" means that the video data and the display data are displayed in a mixing manner.

"Share flag" is determined by reading the event flag table 24 of FIG. 20 by the arrangement information selection part 21 based on the delivery event. By "share flag", "arrangement information No." is uniquely determined. There are two states of the communication terminal 10 receiving the display data, as follows:

a state where the communication terminal 10 with which the external input apparatus 40 is connected is receiving the display data from this external input apparatus 40; and a state where the communication terminal 10 is receiving the display data from the external input apparatus 40 connected with another communication terminal 10.

According to the embodiment, any one of these two states is referred to as "shared". Further, a state where the communication terminal 10 is receiving no display data at all is referred to as "unshared". According to the arrangement information management table 23, the arrangement information of "SHARED_MULTI" of the arrangement information No. 2 is selected when the share flag of the communication terminal 10 is "shared", and the arrangement information of "VIEW_MULTI" of the arrangement information No. 1 is selected when the share flag of the communication terminal 10 is "unshared".

It is noted that the correspondences between the share flags and the sets of the arrangement information are one example, and in an extreme case, the reverse correspondences may be possible. Further, instead of thus referring the above-mentioned two states of the communication terminal 10 receiving the display data as the same "shared", it is also possible to refer these two reception states to "shared 1" and "shared 2", respectively, and associate them with different sets of the arrangement information, respectively. Setting of the arrangement information table 23 may be carried out by respective participants of the communication terminals.

Figure 17:
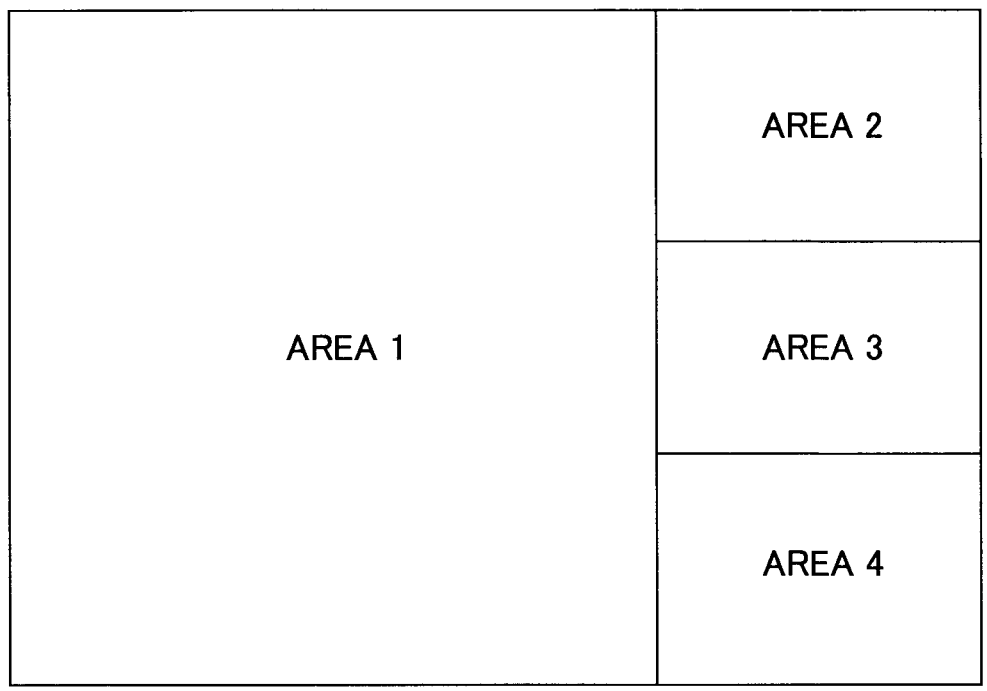
FIG. 17 shows one example of dividing a screen of a display device and one example indicating areas obtained from the dividing.

FIG. 17 is one example of dividing the screen of the display device 100 and one example of a view showing four areas 1, 2, 3 and 4 obtained from the dividing. In areas 1 through 4 shown in FIG. 17, different sets of video data and display data, and therefore, in this example, maximum four sets of video data and display data may be displayed. In the example of FIG. 17, a wider area is allocated to the area 1 than the other areas 2 through 4. The "arrangement information" is used to determine, from among the areas 1 through 4, at which area video data is to be displayed and at which area display data is to be displayed.

FIG. 18 is a view of one example showing relationship between the arrangement information and video data or display data to be allocated to the respective areas 1 through 4. As shown in FIG. 18, in a case of the arrangement information="VIEW_MULTI", video data 1 is displayed at the area 1; video data 2 is displayed at the area 2; . . . , and thus, respective sets of video data are displayed at the areas 1 through 4; and in a case of the arrangement information="SHARED_MULTI", display data is displayed at the area 1; video data 1 is displayed at the area 2; video data 2 is displayed at the area 3; . . . .

The arrangement information will be now described in more detail.

In Case of "VIEW_MULTI":

The arrangement information indicates an arrangement where from the area 1, in sequence, respective sets of video data are allocated up to the number of sets of video data that each communication terminal receives. For example, in a case where two communication terminals 10 are connected to the remote communication system 1, two sets of video data are displayed at the areas 1 and 2, respectively, and nothing is displayed at the areas 3 and 4. At the area 1, the communication terminal 10 displays video data of a participant who is currently to be paid attention to, and thus, the video data photographed by the photographing part 14a of the communication terminal 10 is of the participant who is currently speaking. In order to determine the video data to be displayed at the area 1, in a case where the voice input part 15a of each communication terminal 10 has detected speaking based on the voice level, the display data control part 22 transfers the terminal ID of the corresponding communication terminal 10 to the relay apparatus 30. The relay apparatus 30 delivers the terminal ID to the respective communication terminals 10 in a broadcasting manner, and therefore, the respective communication terminals 10 can determine the video data (of the participant) to be displayed at the area 1. It is noted that the display data control part 22 may transfer the terminal ID of the corresponding communication terminal 10 not to the relay apparatus 30 but to the remote communication management system 50. Further, at the area 2, the video data of the other participant than the participant who is currently speaking is displayed.

In Case of "SHARED_MULTI":

The arrangement information indicates an arrangement where at the area 1, the display data is displayed, and respective sets of video data are allocated to the other areas 2 through 4. In a case where two communication terminals 1 and 2 are connected to the remote communication network 1, the respective sets of video data of the respective communication terminals 10 (=1 and 2) are displayed at the areas 2 and 3, and nothing is displayed at the area 4.

The arrangement information selection part 21 sets the share flag of the own communication terminal 10 as "shared" or "unshared" according to the delivery event for determining whether the display data is being received from the external input apparatus 40 connected with the own communication terminal 10 and whether the display data is being received from another communication terminal 10. To set as "shared" means "1" or "ON" is substituted for a value of the share flag. To set as "unshared" means "0" or "OFF" is substituted for a value of the share flag.

When the arrangement information selection part 21 updates the share flag as mentioned above, the arrangement information selection part 21 reads the arrangement information management table 23 using the updated share flag, and based on the reading result, controls the image display control part 14b to change the allocations of video data and display data to the areas 1 through 4.

Figure 19:
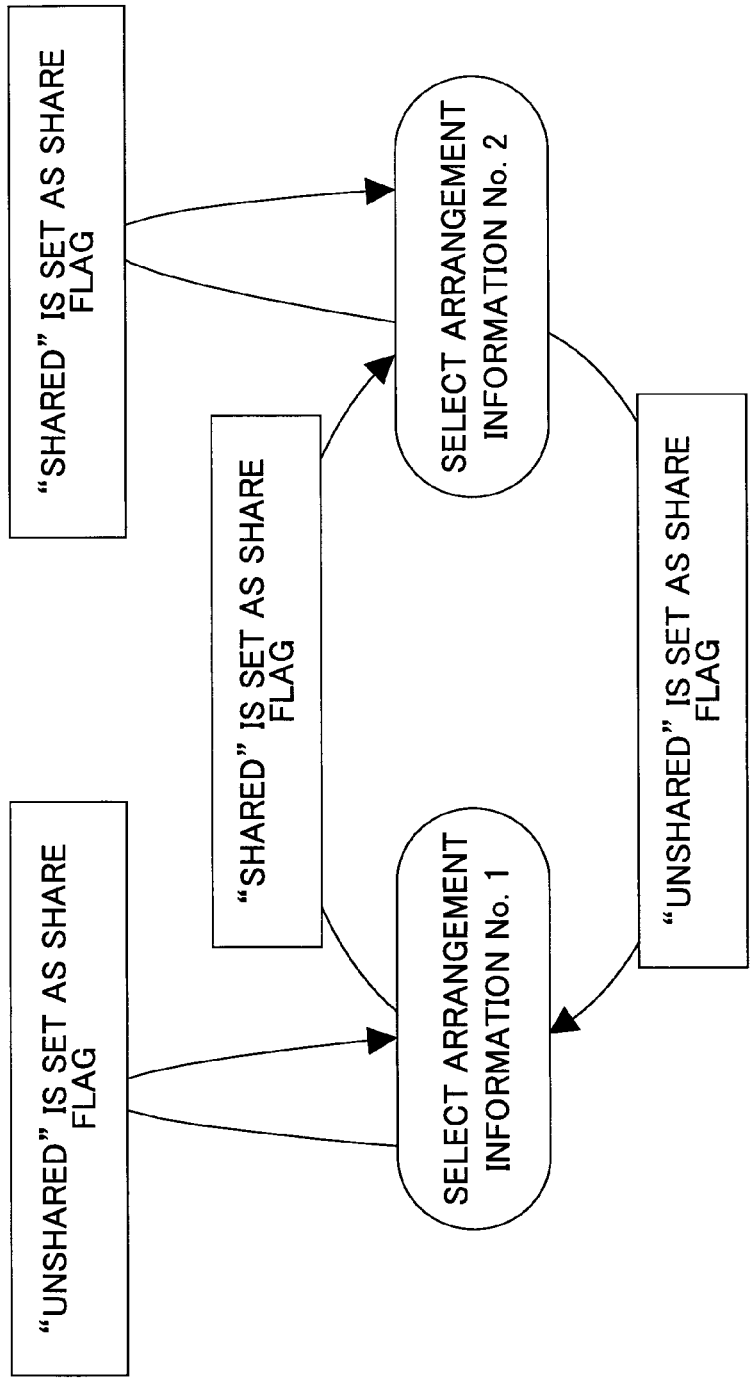
FIG. 19 shows one example of a state transition diagram of selected arrangement information.

FIG. 19 is one example of a state transition diagram of the arrangement information selection part 21 selecting the arrangement information. Whether the initial state is the arrangement information No. 1 or No. 2 depends on whether the display data has been transmitted to the own communication terminal 10 which is in a state immediately after being started up. As shown in FIG. 19, in a case where the arrangement information selection part 21 sets "shared" in the share flag in a state where the arrangement information No. 1 is set, the arrangement information selection part 21 selects the arrangement information No. 2. In a case where the arrangement information selection part 21 sets "unshared" in the share flag in a state where the arrangement information No. 2 is set, the arrangement information selection part 21 selects the arrangement information No. 1. In a case where the arrangement information selection part 21 sets "unshared" in the share flag in a state where the arrangement information No. 1 is set, the arrangement information selection part 21 selects the arrangement information No. 1 as it is. In a case where the arrangement information selection part 21 sets "shared" in the share flag in a state where the arrangement information No. 2 is set, the arrangement information selection part 21 selects the arrangement information No. 2 as it is.

(Display Control Flag)

The display control flag is used by the communication terminal 10 to control a display of a menu and so forth to be displayed on the display device 400 of the external input apparatus 40 by the external input apparatus 40. FIG. 20 shows one example (event flag table 24) of correspondences between the delivery events transmitted from the relay apparatus 30, the share flags set by the arrangement information selection part 21 according to the delivery events and the display control flags determined by the display data control part 22.

The delivery events include "delivery start event", "delivery from another start event", "delivery stop event" and "delivery from another stop event". The share flags corresponding to the first two of the delivery events are "shared" corresponding to the delivery events of the communication terminal 10 receiving the display data. The share flags corresponding to the last two of the delivery events are "unshared" corresponding to the delivery events of the communication terminal 10 not receiving the display data.

Further, the display control flag corresponding to "delivery start flag" is "shared"; the display control flag corresponding to "delivery start from another flag" is "shared_another"; and the display control flags corresponding to "delivery stop flag" and "delivery stop from another flag" are "unshared". The display control flag will be described below in further detail. When receiving the display control flag from the communication terminal 10, the menu control part 44 of the external input apparatus 40 changes the menu to be displayed on the display device 400.

Figure 21A:
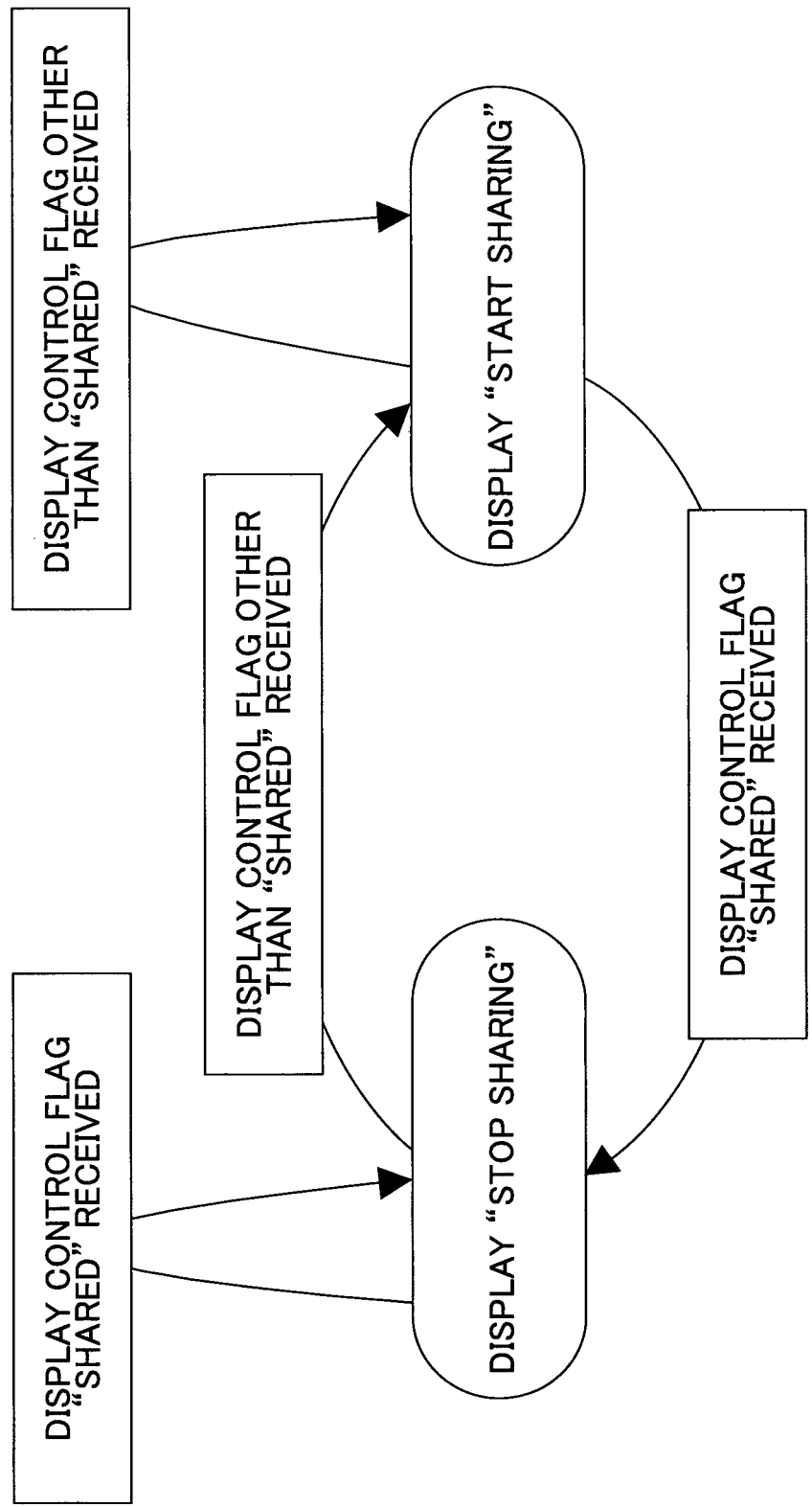

FIG. 21A is one example of a view schematically showing one example of a transition condition table 431. The display device 400 in a state of immediately after being started up displays "start sharing" supposing that the communication terminal 10 is not sharing the display data. "Start sharing" is a menu used to start sharing of the display data of the external input apparatus 40 with the communication terminal 10 other than the communication terminal connected with the external input apparatus 40, and specifically, is a "start sharing" button for receiving an operation of the participant (hereinafter, "start sharing" and a "start sharing" button will be used not strictly as different ones).

When the external input apparatus 40 receives the display control flag "shared" while displaying "start sharing", the menu control part 44 displays "stop sharing" used to stop sharing the display data. "Stop sharing" is a menu used to stop the sharing of the display data, which is being displayed by the external input apparatus 40, with the communication terminal 10 which is not directly connected with the external input apparatus 40, and specifically, is a "stop sharing" button for receiving an operation of the participant (hereinafter, "stop sharing" and a "stop sharing" button will be used not strictly as different ones).

When the external input apparatus 40 receives the display control flag ("unshared" or "unshared another") other than the display control flag "shared" while displaying "stop sharing", the menu control part 44 displays "start sharing" for making it possible to start sharing of the display data.

It is noted that, as shown in FIG. 21A, in a case where the external input apparatus 40 receives the display control flag other than the display control flag "shared" while displaying "start sharing", the menu is kept unchanged. In a case where the external input apparatus 40 receives the display control flag "shared" while displaying "stop sharing", the menu is kept unchanged.

As described above with reference to FIGS. 20 and 21A, it is possible to determine the display state (i.e., the menu) of the display device 400 of the external input apparatus 40 according to the display state of the display data and the video data displayed on the display device 100 of the communication terminal 10, as a result of the share flag and the display control flag being thus associated with the delivery event.

While the menu (401) is being displayed on the display device 400 of the external input apparatus 40, the menu control part 44 displays the sharing state (402) according to the display control flag, as will be described later with reference to FIGS. 28A through 28D. FIG. 21B shows one example of a correspondence relationship between the display control flags and the sharing states. Such correspondence relationship is stored in the storage part 43 together with the transition condition table 431.

The "sharing state" is displayed in a message field on the screen of the external input apparatus 40, and thereby, the participant can understand the "current sharing state" of the communication terminal 10. The "sharing states" include the following states:
  (a) the communication terminal 10 is not sharing the display data (unshared);
  (b) the communication terminal 10 is sharing the display data displayed by the external input apparatus 40 connected with the own terminal (shared); and
  (c) the communication terminal 10 is sharing the display data displayed by the external input apparatus 40 connected with another communication terminal 10 (shared_another).

[Operation Procedure]

FIG. 22 shows one example of a flowchart of a process of establishing a session between the communication terminals. When the participant presses the operating button 108 shown in FIG. 2 of the communication terminal 1 (communication terminal 10) and selects another communication terminal 2 (communication terminal 10), the operation input repetition part 12 shown in FIG. 4B receives a request to start remote communication with the other communication terminal 2.

In step S1, the transmission/reception part 11 of the communication terminal 1 transmits the start request information to the remote communication management system 50. The start request information includes the terminal ID "Olaa" of the request source communication terminal 1 and the terminal ID "01db" of the destination communication terminal 2. The transmission/reception part 51 of the remote communication management system 50 receives the start request information and understands the IP address "1.2.1.3" of the transmission source communication terminal 1.

In step S2, the terminal IP address extraction part 56b of the remote communication management system 50 searches the terminal management DB (see FIG. 10) based on the terminal ID of the request source communication terminal 1 and the terminal ID of the destination communication terminal 2 included in the start request information transmitted from the request source communication terminal 1, and thereby extracts the IP addresses of the respective communication terminals 1 and 2.

In step S3, the transmission/reception part 51 of the remote communication management system 50 transmits relay start request information indicating a request to start relaying to the relay apparatus 30 via the communication network 2. The relay start request information includes the respective IP addresses ("1.2.1.3" and "1.3.2.4") of the request source communication terminal 1 and the destination communication terminal 2 for which relaying is to be carried out. Thereby, the relay apparatus 30 can establish a session for carrying out remote communication between the communication terminals 1 and 2 for three sets of image data of low resolution, medium resolution and high resolution, and voice data. Thereby, the communication terminals 1 and 2 can start a TV conference.

In step S4, the relay apparatus 30 establishes the session for carrying out remote communication between the communication terminals 1 and 2 for the image data and the voice data. Specifically, the communication terminal 1 obtains the IP addresses of the relay apparatus 30 and the communication terminal 2, and the communication terminal 2 obtains the IP addresses of the relay apparatus 30 and the communication terminal 1.

In step S5, the transmission/reception part 11 of the communication terminal 1 transmits a session establishment event to the external input apparatus 40. The session establishment event is information for notifying that the session has been established between the communication terminals.

FIG. 23 is one example of a sequence diagram showing a process of transmitting the image data and the voice data between the communication terminals 10. With reference to FIG. 23, a process of transmitting the image data and the voice data in order to carry out a TV conference between two terminals (i.e., the communication terminal 1 and the communication terminal 2) from among the communication terminals 10 will be described now.

First, the communication terminal 1 transmits image data of an object photographed by the photographing part 14a and voice data of voice input by the voice input part 15a to the relay apparatus 30 via the communication network 2 from the transmission/reception part 11 (step S81). It is noted that according to the embodiment, image data of high image quality including the three resolutions of the low resolution, the medium resolution and the high resolution, and the voice data, are transmitted. Thus, the relay apparatus 30 receives the image data of the three resolutions and the voice data from the transmission/reception part 31. Then, the data quality determination part 33 searches the change quality management table (see FIG. 7) using the IP address "1.3.2.4" of the communication terminal 2, extracts the corresponding image quality of image data to relay, and thus, recognizes the image quality of the image data to relay (step S82). In this case, the determined image quality of image data is "high image quality", and it is the same as the image quality of the image data received by the transmission/reception part 31. Therefore, the relay apparatus 30 transfers the image data of the image quality, as it is, and the voice data of the voice quality, as it is, to the communication terminal 2 (step S83). Thus, the communication terminal 2 receives by the transmission/reception part 11 the image data and the voice data, the image display control part 14b can display the image based on the received image data on the display device 100, and the voice output part 15b can output the voice based on the received voice data.

It is note that although not shown, the relay apparatus 30 may return the image data to the communication terminal 1 when having changed the quality of the image of the image data or without regard to whether having changed the quality of the image of the image data. Thereby, it is possible to cause the quality of the video displayed on the display device 100 by the communication terminal 1 to be the same as that of the other communication terminal 2.

Next, the delay detection part 17 of the communication terminal 2 detects the delay time of reception of the image data received by the transmission/reception part 11 at certain time intervals (for example, once a second) (step S84). It is noted that description will be carried out below for a case where the thus-detected delay time is 200 ms, for example. The detection of the delay time in the reception of the image data may be carried out by, for example, information indicating transmission date and time when the image data is transmitted from the communication terminal 1 being attached to the image data, and the communication terminal 2 calculating the delay time based on the difference between the transmission and reception of the received image data, using the information indicating the transmission date and time attached to the received image data and the reception date and time when the received image data is received by the communication terminal 2.

The transmission/reception part 11 of the communication terminal 2 transmits delay information indicating the delay time "200 ms" to the remote communication management system 50 via the communication network 2 (step S85).

Thereby, the remote communication management system 50 can determine the delay time and also determine the IP address "1.3.2.4" of the communication terminal 2 that is the transmission source of the delay information.

Next, the delay time management part 60 of the remote communication management system 50 searches the terminal management table (see FIG. 10) using the IP address "1.3.2.4" of the above-mentioned communication terminal 2 as a search key, extracts the corresponding terminal ID "01db", stores the delay time "200 ms" indicated by the above-mentioned delay information at the field area of delay time on the record of the above-mentioned terminal ID "01db" in the session management table of, the session management DB 5005 (see FIG. 12), and manages it (step S86)

Next, the quality determination part 58 searches the quality management table (see FIG. 15) using the above-mentioned delay time "200 ms" as a search key, extracts the corresponding image quality "medium image quality" of image data, and thus determines the image quality to be "medium image quality" (step S87).

Next, the transmission/reception part 51 obtains the relay apparatus ID "111a" associated with the above-mentioned terminal ID "01db" from the session management table (see FIG. 12), searches the relay apparatus management table (see FIG. 8) using the relay apparatus ID "111a" as a search key, and extracts the IP address "1.2.1.2" of the corresponding relay apparatus 30 (step S88). Then, the transmission/reception part 51 transmits the quality information indicating the image quality "medium image quality" determined in step S87 to the relay apparatus 30 via the communication network 2 (step S89). The quality information includes the IP address "1.3.2.4" of the communication terminal 2 used as the search key in step S86. Thereby, the change quality management part 34 in the relay apparatus 30 stores the IP address "1.3.2.4" of the communication terminal 10 (here, the communication terminal 2) as the transmission destination and the image quality "medium image quality" of image data to be relayed in the change quality management table (see FIG. 7) in a manner of associating them with one another, and manages them (step S90).

Next, the communication terminal 1 continuously transmits the image data of the high image quality including the three resolutions of the low resolution, medium resolution and high resolution and voice data to the relay apparatus 30 (step S91). Thereby, the same as step S82 mentioned above, the data quality determination part 33 of the relay apparatus 30 searches the change quality management table (see FIG. 7) using the IP address "1.3.2.4" of the communication terminal 2 as a search key, extracts the corresponding image quality "medium image quality" to relay, and thus determines the quality of the image of the image data to relay (step S92). In this case, the thus-recognized image quality of image data to relay is "medium image quality" which is lower than the image quality "high image quality" of the image data received by the transmission/reception part 31. Therefore, the data quality changing part 35 reduces the image quality of the image data from "high image quality" to "medium image quality", and thus changes the quality of the image of the image data (step S93). Then, the transmission/reception part 31 transmits the image data for which the image quality has been thus changed to "medium image quality" and the voice data for which the voice quality has not been changed to the communication terminal 2 via the communication network 2 (step S94). Thus, in the case where the delay in the reception occurs in the communication terminal 2 that receives the image data, the relay apparatus 30 changes (reduces) the quality of the image to reduce the delay, and thus, it is possible to prevent the persons participating in the TV conference from feeling that something is wrong.

<Transmission of Display Data>

Figure 24A:
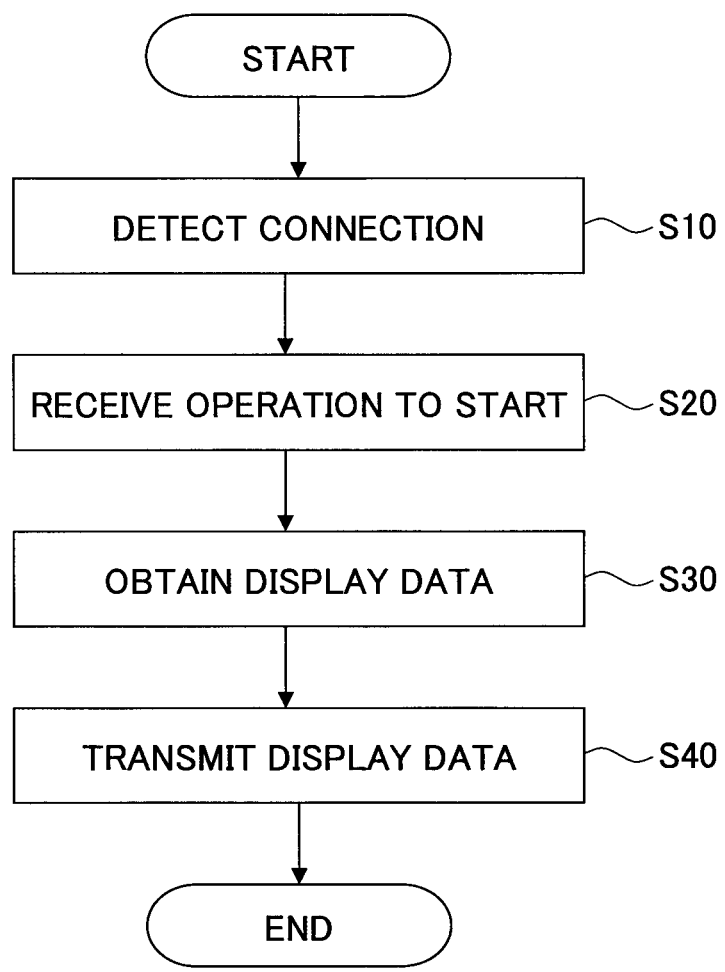
FIGS. 24A and 24B show one example of a flowchart of a procedure of transmitting display data to the communication terminal from the external input apparatus.

FIG. 24A is one example of a flowchart of a procedure of transmitting the display data to the communication terminal 10 from the external input apparatus 40.

When the external input apparatus 40 and the communication terminal 10 are connected together, the connection detection part 42 of the external input apparatus 40 detects having been connected with the communication terminal 10 (step S10). The connection detection part 42 thus detects that data transmission with the communication terminal 10 has become possible as a result of, for example, the external apparatus I/F 215 detecting a voltage or a signal.

The connection detection part 42 causes the display device 400 to display the menu for receiving the participant's operation for "start sharing" of the display data, and when the participant presses the corresponding menu displayed on the display device 400, the operation input reception part 46 receives the participant's operation for "start sharing" of the display data (step S20).

When the operation input reception part 46 thus receives the participant's operation for "start sharing" of the display data, the display data obtaining part 451 obtains the display data for the purpose of transmitting the display data (step S30). The display data is image data to be used for a TV conference, and may change. Therefore, the display data obtaining part 451 obtains the display data periodically (for example, once a second), or obtains the display data when detecting a change in the image data on the screen of the display device 400.

When the display data obtaining part 451 thus obtains the display data, the display data transmission part 452 transmits the display data obtained by the display data obtaining part 451 to the communication terminal 2 via the communication terminal 1 (step S40).

There is a likelihood that any one of the external input apparatuses 40 connected with the respective communication terminals 10 that participate in a TV conference (for example, registered in the destination list management table) transmits the display data, and the any one of the external input apparatuses 40 may transmit the display data in a procedure such as that described above.

Figure 24B:
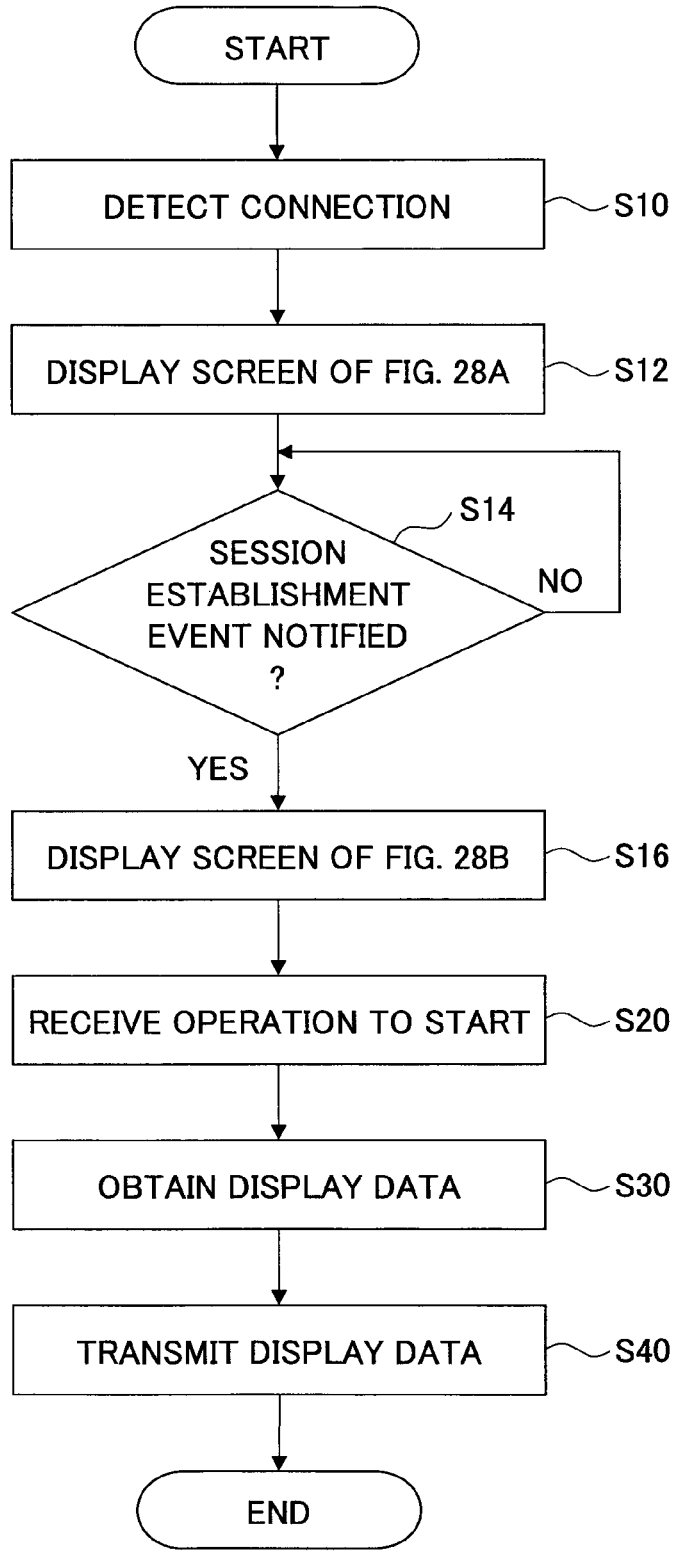

FIG. 24B is another example of a procedure of transmitting the display data from the external input apparatus 40 to the communication terminal 10. In the example of FIG. 24B, the external input apparatus 40 transmits the display data to the destination communication terminal 2 after determining that a session has been established with the destination communication terminal 2.

When the external input apparatus 40 and the communication terminal 10 are connected together, the connection detection part 42 of the external input apparatus 40 detects having been connected with the communication terminal 10 (step S10). The connection detection part 42 thus detects that data transmission with the communication terminal 10 has become possible as a result of, for example, the external apparatus I/F 215 detecting a voltage or a signal.

Figure 28A:
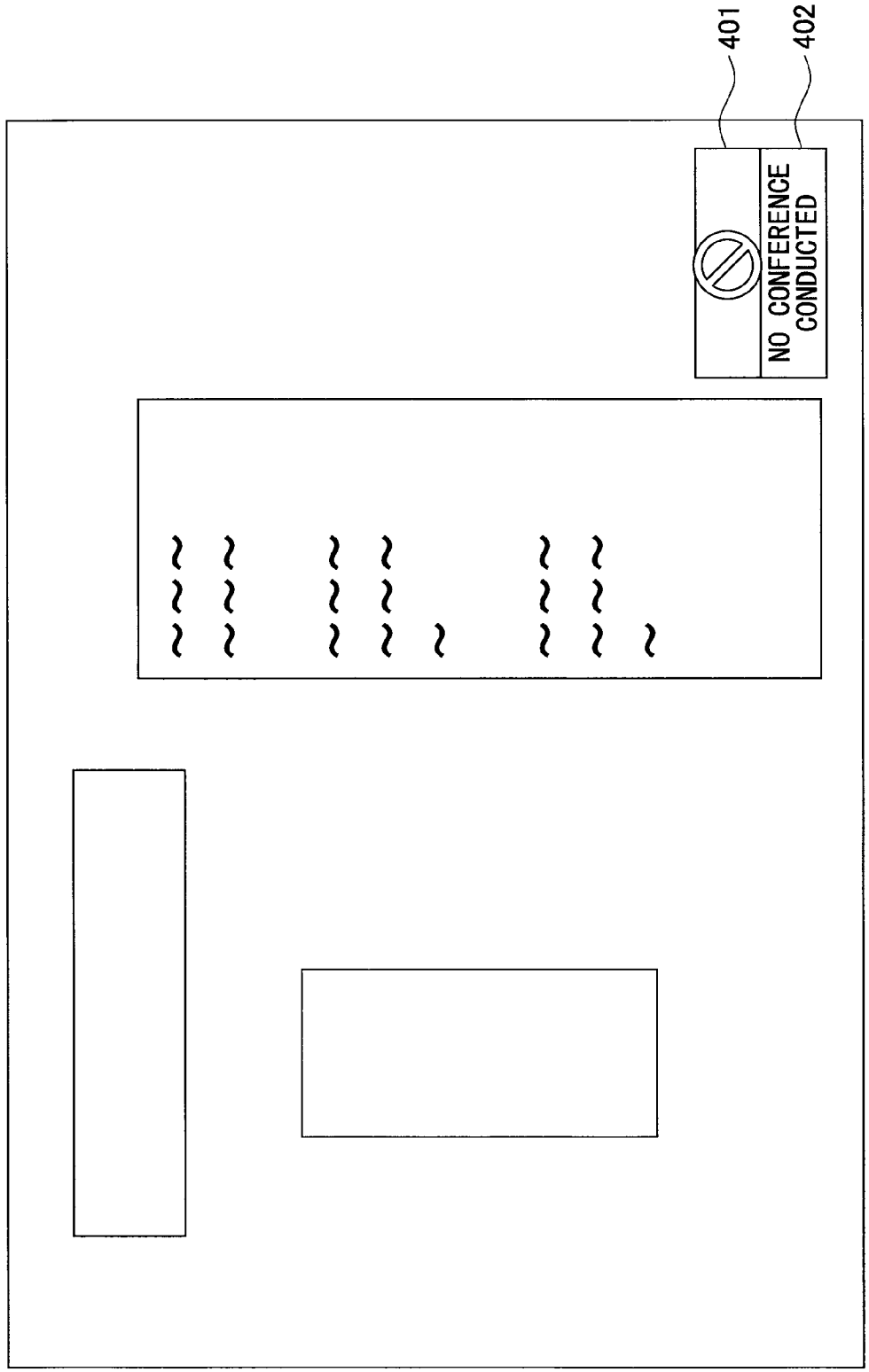

When the connection detection part 42 thus detects having been connected with the communication terminal 10, the menu control part 44 of the external input apparatus 40 displays a screen page shown in FIG. 28A on the display device 400 (step S12). FIGS. 28A through 28D show examples of screen pages displayed by the external input apparatus 40. As shown in FIG. 28A, no characters/letters (text) are displayed at a menu 401, and a message "no conference conducted" (meaning "no conference is being conducted") is displayed at a menu 402. This message indicates that no session has been established. Thereby, the participant can determine that no conference is being conducted.

The menu control part 44 determines whether a session establishment event notification has been received from the communication terminal 1 (step S14). The session establishment event corresponds to step S5 in FIG. 22, and is sent to the external input apparatus 40 from the communication terminal 10 when it is detected that a session has been established between the communication terminals 1 and 2.

In a case where no session establishment event notification has been received (step S14 NO), the external input apparatus 40 maintains the screen page of FIG. 28A.

In a case where the session establishment event notification has been received (step S14 YES), the menu control part 44 of the external input apparatus 40 displays a screen page of FIG. 28B.

On the screen page of FIG. 28B, the "start sharing" button is displayed as the menu 401 and a message "not shared" (meaning "no sharing is being carried out") is displayed as the sharing state 402. The screen page of FIG. 28B indicates at the menu 402 that sharing is not being carried out, and also, indicates at the menu 401 that the user's operation input to start sharing is possible. The "start sharing" button may be pressed directly as a result of the participant pressing a touch panel or may be pressed as a result of the participant operating the keyboard 211 or the mouse 212 (see FIG. 3).

When the operation input reception part 46 receives the user's operation to start sharing, the display data obtaining part 45a obtains the display data of the display device 400 for the purpose of transmitting the display data (step S30). The display data is image data to be used for a TV conference, and may change. Therefore, the display data obtaining part 451 obtains the display data periodically (for example, once a second), or obtains the display data when detecting a change in the image data displayed on the screen of the display device 400.

When the display data obtaining part 451 thus obtains the display data, the display data transmission part 452 transmits the display data obtained by the display data obtaining part 451 to the communication terminal 2 via the communication terminal 1 (step S40).

It is noted that in a case where the external input apparatus 40 is connected with the communication terminal 10 where a session has been already established, the session establishment event notification is sent to the external input, apparatus 40 immediately after the connection. Therefore, the screen page of FIG. 28A is skipped, and the screen pages of FIG. 28B is displayed.

Figure 25:
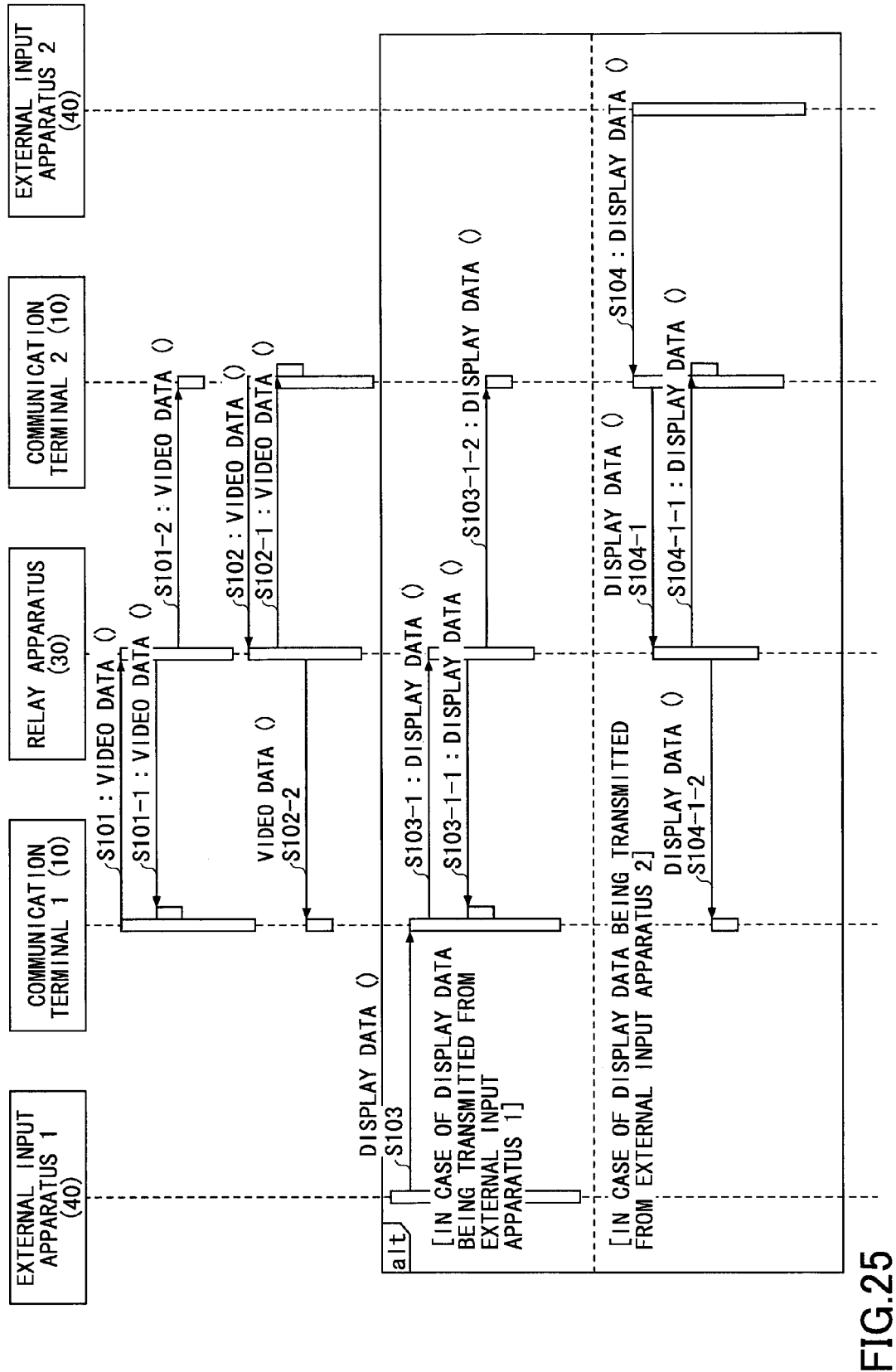
FIG. 25 shows one example of a sequence diagram of transmitting video data photographed at a communication terminal 1 (communication terminal 10), video data photographed at a communication terminal 2 (communication terminal 10) and display data transmitted from external input apparatuses 1, 2 (external input apparatuses 40) connected with the communication terminals 1, 2 (communication terminals 10)

FIG. 25 is one example of a sequence diagram of transmission of video data photographed at the communication terminal 1, video data photographed at the communication terminal 1 and display data transmitted from the external input apparatuses 1 and 2 connected with the communication terminals 1 and 2, respectively. It is noted that although voice data is omitted, voice data is transmitted together with video data.

In step S101, video data being photographed at the communication terminal 1 is transmitted by the image display control part 14b to the relay apparatus 30 first via the transmission/reception part 11.

In steps S101-1 and S101-2, when the transmission/reception part 31 of the relay apparatus 30 receives the video data, after a process of changing the quality of the video data may be carried out, the transmission/reception part 31 transmits the video data to the respective communication terminals 1 and 2.

In step S102, in the same way, the video data being photographed at the communication terminal 2 is transmitted to the relay apparatus 30 first.

In steps S102-1 and S102-2, in the relay apparatus 30, after a process of changing the quality of the video data may be carried out, the transmission/reception part 31 transmits the video data to the respective communication terminals 1 and 2.

In step S103, in a case where display data is transmitted from the external input apparatus 1 (external input apparatus 40), the display data is transmitted to the communication terminal 1 via the transmission/reception part 41 from the display data transmission part 452 of the external input apparatus (this process corresponds to the process of step S40 in FIG. 24).

In step S103-1, the display data received by the external information transmission/reception part 18 of the communication terminal 1 is transmitted to the relay apparatus 30 first, the same as the video data.

In steps S103-1-1 and S103-1-2, the relay apparatus 30 transmits the display data to the respective communication thermals 1 and 2.

In step S104, also in a case where display data is transmitted from the external input apparatus (external input apparatus 40), the display data is transmitted to the communication terminal 2 via the transmission/reception part 41 from the display data transmission part 452 of the external input apparatus 2.

In step S104-1, the display data received by the external information transmission/reception part 18 of the communication terminal 2 is transmitted to the relay apparatus 30 first, the same as the video data.

In steps S104-1-1 and S104-1-2, the relay apparatus 30 transmits the display data to the respective communication thermals 1 and 2.

It is noted that the relay apparatus 30 may be a fixed one or may be one selected from among plural relay apparatuses 30. Further, in FIG. 25, for the purpose of simplifying the description, the number of the communication terminals is two. However, also in a case of equal to or more than three communication terminals, the transmission may be carried out in a similar procedure. Further, the external input apparatus 1 may be connected also with the communication terminal 2, and the external input apparatus 1 may transmit the display data via the commutation terminal 2.

Thus, in the remote communication system 1 according to the embodiment, the display data of the external input apparatus 40 is transmitted via the communication terminal 10. Therefore, it is possible to transmit the display data to another communication terminal 10 merely by using common network fundamental technology having been used for video data.

Further, when the display data is transmitted from any one of the external input apparatuses 40, delay times at the respective communication terminals 10 may be approximately same since the display data is transmitted via the relay apparatus 40. Therefore, when a person who is giving an explanation during a TV conference changes a page of material, the display contents are changed accordingly approximately at the same time at the respective communication terminals of the respective locations, and therefore, the communication among the locations is not disturbed.

<Process to Start Sharing of Display Data>

Figure 26:
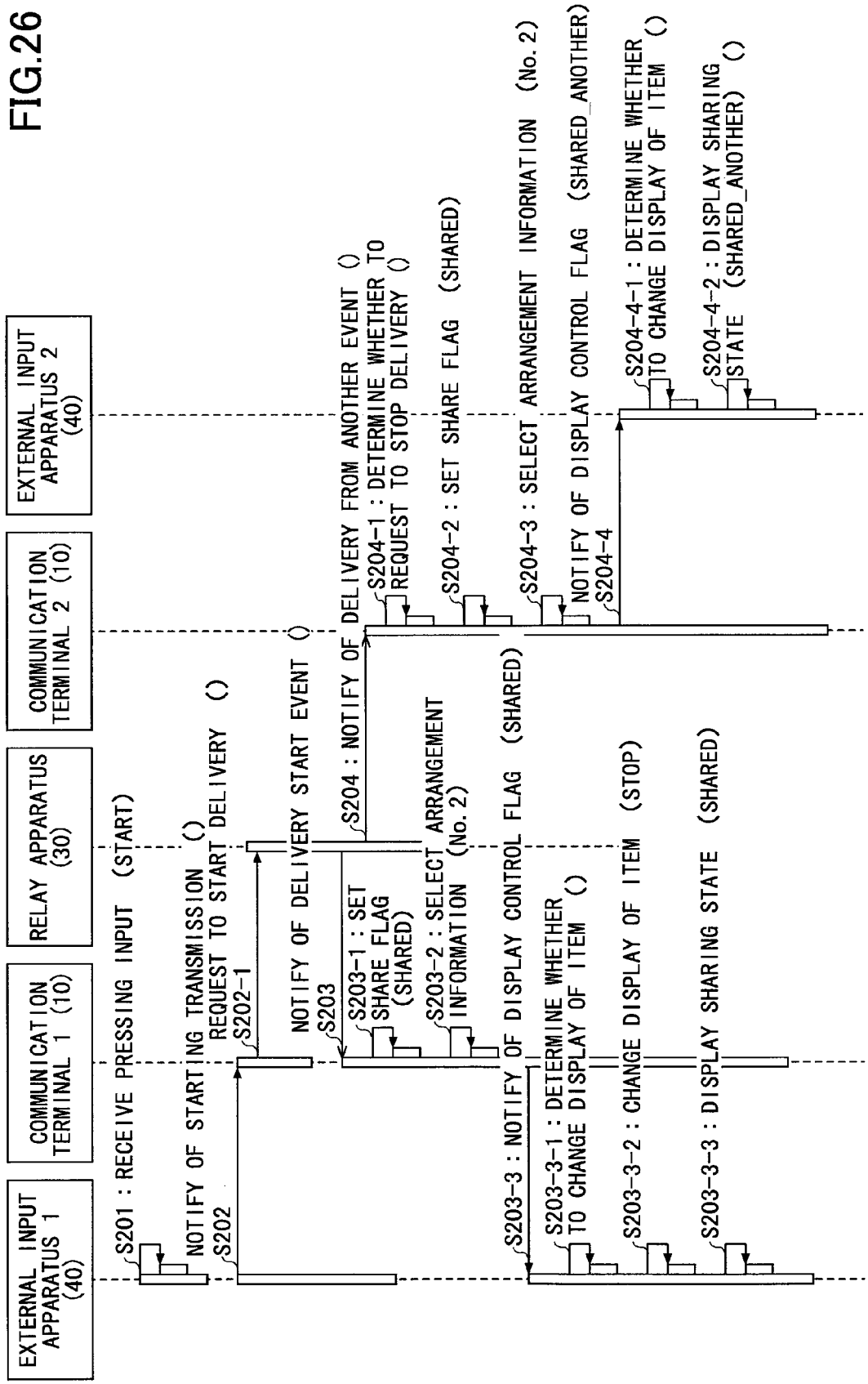
FIG. 26 shows one example of a sequence diagram of a control procedure when transmission of display data is started by the external input apparatus in steps S103 or S104 of FIG. 25.

FIG. 26 is one example of a sequence diagram showing a control procedure when transmission of the display data is started by the external input apparatuses 1 and 2 in steps S103 and S104 of FIG. 25.

It is noted that the share flag is "unshared" until the communication terminal 10 receives the display data as described above. Accordingly, on the screen of the display device 100 of the communication terminal 10, only the video data is displayed.

Figure 27B:
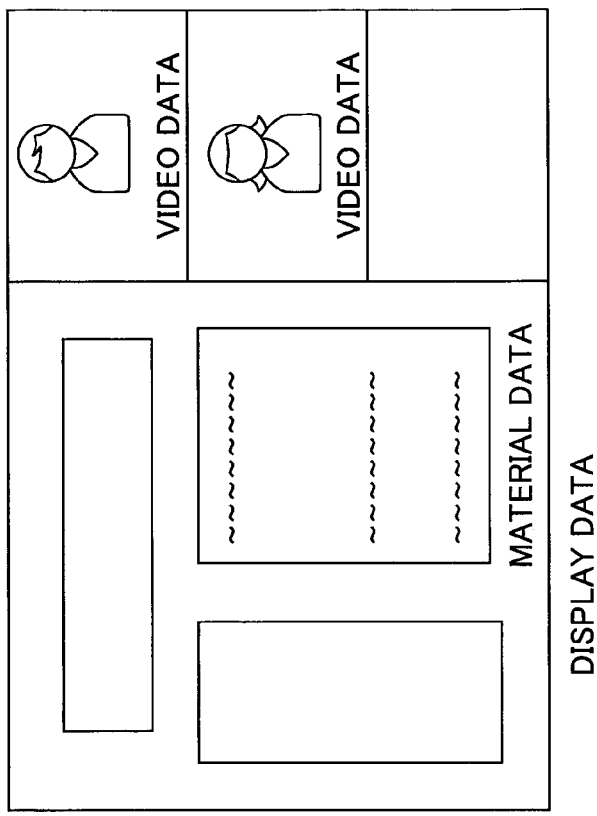
FIGS. 27A and 27B are one example schematically showing states of a screen of a display device when the communication terminal receives the display data.
Figure 27A:
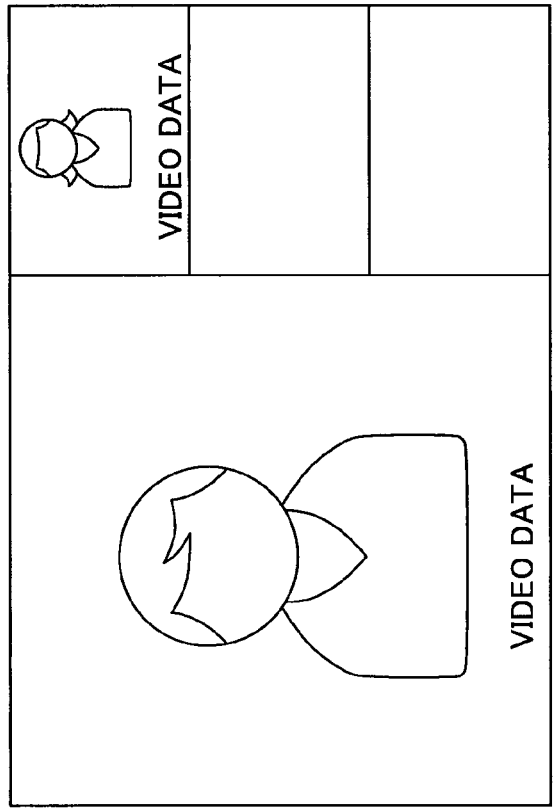

FIG. 27A is one example schematically showing a state of the screen of the display device 100 until the communication terminal 10 receives the display data. In the state where the share flag is "unshared", the arrangement information selection part 21 is selecting the arrangement information No. 1 according to the arrangement information management table 23. Therefore, as shown in FIG. 27A, at the areas 1 and 2, respective sets of the video data received from the relay apparatus 30 are displayed (see FIG. 17). Whether the arrangement information selection part 21 displays, at the area 1, the video data of the own communication terminal 10 or the video data of the other communication terminal 10 is described above in the description of the arrangement information management table 23. However, whether the arrangement information selection part 21 displays, at the area 1, the video data of the own communication terminal or the video data of the other communication terminal may be switched according to the participant's operation.

Further, until the communication terminal 10 is notified of the delivery event, the display data control part 22 is transmitting no display control flag to the external input apparatus 40 or is transmitting the display control flag "unshared" to the external input apparatus 40. The menu control part 44 of the external input apparatus 40 displays a screen page the same as that having been displayed immediately after being started up or displays the menus corresponding to the display control flag "unshared" on the display device 400.

FIGS. 28A through 28D show examples of screen pages displayed by the external input apparatus 40. FIG. 28A has been already described above. FIG. 28B shows one example of the menu 401 and the sharing state 402 displayed by the external input apparatus 40. On the screen page of FIG. 28B, the "start sharing" button is displayed as the menu 401, and a message "not shared" is displayed as the sharing state 402. The "start sharing" button may be pressed directly as a result of the participant pressing a touch panel or may be pressed as a result of the participant operating the keyboard 211 or the mouse 212 as mentioned above.

It is noted that on the screen page of FIG. 28B, the display data of material that the external input apparatus 40 has is displayed, and other than this, a window for state indication and another set of material are displayed. In a case where the participant intends to share the display data being displayed by the external input apparatus 40 with the other communication terminal 2, the participant presses the "start sharing" button. Thereby, the external input apparatus 40 starts transmitting the display data.

Returning to FIG. 26, in step S201, in step S201, the operation input reception part 46 receives the participant's pressing the "start sharing" button displayed by the external input apparatus 1. This process corresponds to step S20 in FIG. 24.

In step S202, the display data transmission part 452 notifies the communication terminal 1 of "start sharing", and starts transmitting the display data. This process corresponds to step S40 in FIG. 24 and steps S103 and S104 in FIG. 25.

In step S202-1, the display data control part 22 of the communication terminal 1 requests the relay apparatus 30 to start delivery, and transmits the display data to the relay apparatus 30. This process corresponds to step S103-1 in FIG. 25.

In step S203, the data quality changing part 35 in the relay apparatus 30 may change the quality of the display data, notifies the communication terminal 1 of "delivery start event", and starts delivery of the display data. This process corresponds to steps S103-1-1 S104-1-1 in FIG. 25.

In step S203-1, when the arrangement information selection part 21 of the communication terminal 1 receives "delivery start event", sets the share flag into "shared" according to the event flag table 24 (see FIG. 20).

In step S203-2, the arrangement information selection part 21 of the communication terminal 1 selects the arrangement information No. 2 according to the arrangement information management table 23 (see FIG. 16), and gives an instruction to the image display control part 14*b* to allocate the video data and the display data to the areas 1 through 4, respectively.

Thereby, the state of the display device 100 is changed from FIG. 27A to FIG. 27B. In FIG. 27B, the display data is displayed at the area 1, and respective sets of the video data are displayed at the areas 2 and 3.

In step S203-3, since "delivery start event" has been thus notified to the communication terminal 1 in step S203, the display data control part 22 sets the display control flag as "shared" according to the event flag table 24, and notifies the external input apparatus 40 of this display control flag.

In step S203-3-1, according to the transmission condition table 431 (see FIG. 21A), the menu control part 44 of the external input apparatus 40 determines whether to change the display of the menu 401 according to the display control flag.

In step S203-3-2, since the external input apparatus 1 has received the display control flag "shared" in the state where the "start sharing" button is displayed as shown in FIG. 28B (since the session has been already established and the session establishment event notification has been received (see FIG. 24B, step S16)), the menu control part 44 changes the menu 401 on the display device 400 to "stop sharing" button. FIG. 28C shows an example of a screen page where the "stop sharing" button is displayed on the display device 400.

In step S203-3-3, since the menu control part 44 has thus received the display control flag "shared", the menu control part 44 displays a message "this display shared" (meaning "this display is being shared") ("shared" in FIG. 26) in the sharing state 402 as shown in FIG. 28C (also see FIG. 21B).

In step S204, the data quality changing part 35 in the relay apparatus 30 may change the quality of the display data, notifies the communication terminal 2 of "delivery from another start event" and starts delivery of the display data. This process corresponds to steps S103-1-2 and S104-1-2.

In step S204-1, the display data control part 22 of the communication terminal 2 determines whether to request the relay apparatus 30 to stop delivery in a case of thus receiving "delivery from another start event". This determination is necessary for the purpose of determining which of the respective sets of the display data is to be displayed in a case where the communication terminal 2 has already shared displayed data. The specific method of this determination will be described later with reference to FIG. 30. In this case, since the share flag of the communication terminal 2 is "unshared" (in FIG. 30, step S420 NO), the communication terminal 2 does not request the relay apparatus 30 to stop delivery.

In step S204-2, when thus receiving "delivery from another start event", the arrangement information selection part 21 of the communication terminal 2 sets the share flag into "shared" according to the event flag table 24.

In step S204-3, the arrangement information selection part 21 of the communication terminal 2 selects the arrangement information No. 2 according to the arrangement information management table 23 since the share flag "shared" is thus set, and gives an instruction to the image display control part 14*b* to allocate the video data and the display to the areas 1 through 4. Thereby, the state of the display device 100 is changed from FIG. 27A to FIG. 27B.

In step S204-4, since the communication terminal 2 has been thus notified of "delivery from another start event" in step S204, the display data control part 22 sets the display control flag as "shared_another" according to the event flag table 24, and notifies the external input apparatus 2 of this display control flag.

In step S204-4-1, the menu control part 44 of the external input apparatus 2 determines, according to the transition condition table 43 of FIG. 21A, whether to change the display at the menu 401 according to the display control flag. Since the external input apparatus 40 has received the display control flag "shared_another" (other then "shared") in the state where the "start sharing" button is displayed as shown in FIG. 28B (since the session has been already established and the session establishment event notification has been received (see FIG. 24B, step S16)), the menu control part 44 does not change the menu 401 of the display device 400.

In step S204-4-2, the menu control part 44 reads the display control flag and displays the sharing state 402 of "another display shared" (meaning "another display is being shared") ("shared_another" in FIG. 26).

FIG. 28D shows an example of a screen page displayed on the display device 400 of the external input apparatus 40 in a case where the communication terminal 2 is sharing the display data of the communication terminal 1. On the screen page of FIG. 28D, the menu 401 is "start sharing", and "another display shared" is displayed at the sharing state 402.

Thus, at the external input apparatus 1, the menu 401 is changed from the "start sharing" button into "stop sharing" button, and the sharing state 402 is changed from "not shared" into "this display shared". Further, at the external input apparatus 2, the menu 401 is not changed and the sharing state 402 is changed from "not shared" into "another display shared". Therefore, the participants can carry out sharing by operating the menu 401, and can determine, at a glance, whether the own communication terminals 10 are sharing the display data of the external input apparatuses 40 connected with the own communication apparatuses 10, by visually checking the sharing state 402.

<Switching of Shared Display Data>

A procedure when transmitting the display data from the external input apparatus 2 after the process of FIG. 26 will be described now. On the display devices 100 of the communication terminals 1 and 2, the screen pages of FIG. 27B are being displayed, respectively; FIG. 28C is being displayed on the display device 400 of the external input apparatus 1; and FIG. 28D is being displayed on the display device 400 of the external input apparatus 2.

Figure 29:
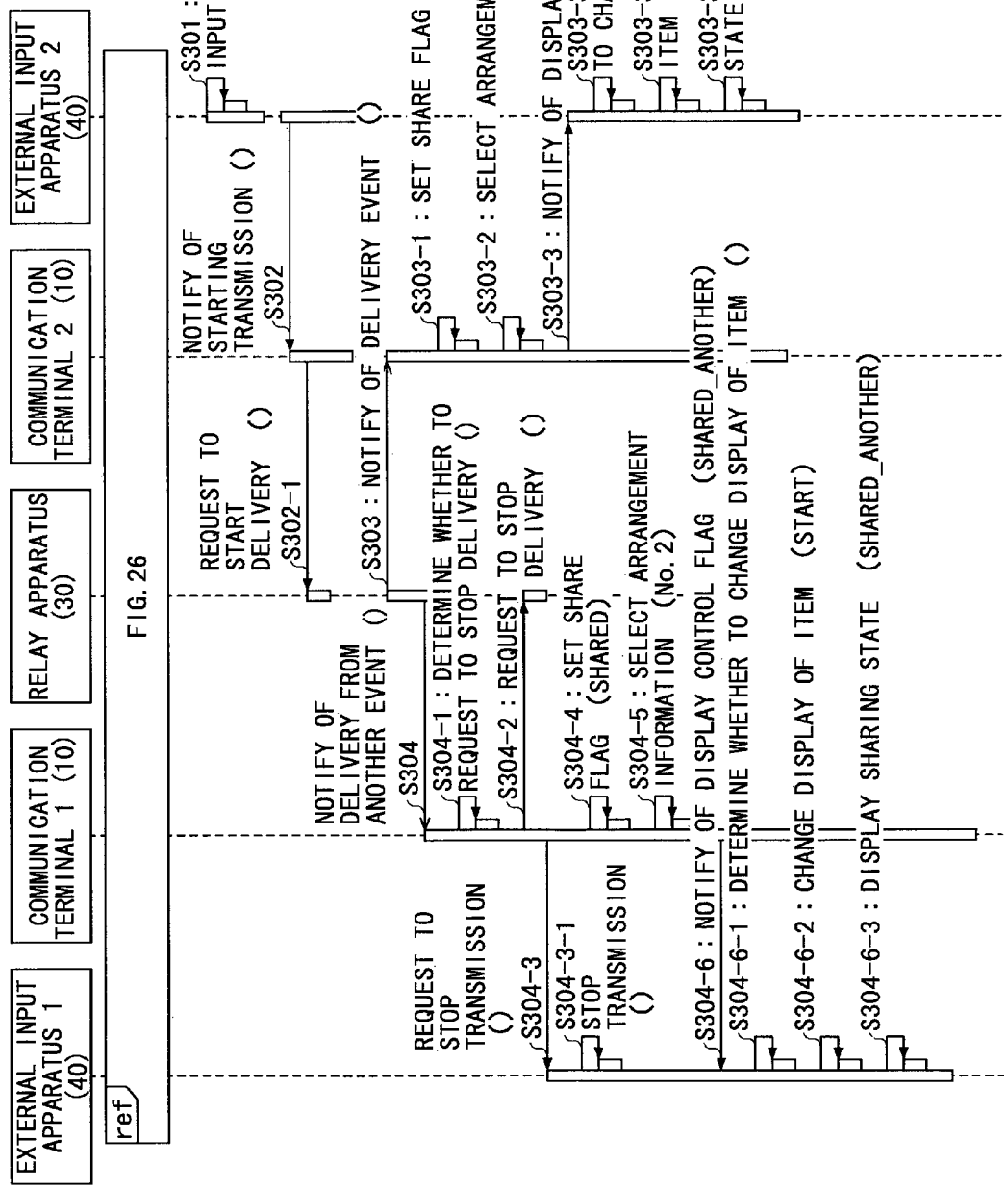
FIG. 29 is one example of a sequence diagram showing a control procedure when the external input apparatus starts transmission of the display data.

FIG. 29 is one example of a sequence diagram showing a control procedure when the external input apparatus 2 starts transmission of the display data.

Steps S301 through S304 are the same as steps S201 through S204 of FIG. 26 merely except that the external input apparatus 1 is replaced by the external input apparatus 2, and therefore, description of steps S301 through S304 will be omitted.

In step S304-1, the display data control part 22 of the communication terminal 1 determines whether to request the relay apparatus 30 to stop the delivery in a case where "start delivery from another event" has been notified.

In step S304-2, as will be described later with reference to FIG. 30, since the share flag of the communication terminal 1 is "shared" (in FIG. 30, step S420 YES), the display data control part 22 requests the relay apparatus 30 to stop the delivery (in FIG. 30, step S430). The data quality changing part 35 of the relay apparatus 30 carries out a process which will be described later with reference to FIG. 31, and stops the delivery of the display data (i.e., stops the transmission of the display data transmitted in steps S103-1-1 and S103-1-2 in FIG. 25) (in FIG. 31, step S510). It is noted that at this time, since the relay apparatus 30 has received the request to start delivery from the communication terminal 2 in step S302-1 and thus there is other display data that the relay apparatus 30 is delivering (in FIG. 31, step S520 YES), the relay apparatus 30 notifies of neither "delivery stop event" nor "delivery from another stop event".

In step S304-3, the display data control part 22 of the communication terminal 1 requests the external input apparatus 1 to stop the transmission of the display data for the purpose of responding to the above-mentioned "start delivery from another event". Thereby, as will be described later for step S304-6, it is possible to control the display data to be shared to the single set of the display data. The communication terminal 1 may request the external input apparatus 1 to stop the transmission of the display data by notifying of the display control flag "shared_another".

In step S304-3-1, the display data transmission part 452 of the external input apparatus 1 stops the transmission of the display data. As a result of the stopping, the transmission of the display data transmitted in steps S103 and S103-1 of FIG. 25 is stopped.

In step S304-4, since having received "delivery from another start event", the arrangement information selection part 21 of the communication terminal 1 sets the share flag into "shared" according to the event flag table 24.

In step S304-5, the arrangement information selection part 21 of the communication terminal 1 selects the arrangement information No. 2 according to the arrangement information management table 23, and gives an instruction for the correspondences between the areas 1 through 4 and the display data and the video data to the image display control part 14*b*.

In step S304-6, since the communication terminal 1 has been notified of "start delivery from another event" in step S304, the display data control part 22 of the communication terminal 1 notifies the external input apparatus 1 of the display control flag "shared_another" according to the event flag table 24.

In step S304-6-1, the menu control part 44 of the external input apparatus 1 determines whether to change the display at the menu 401 based on the transition condition table 431 of FIG. 21A.

In step S304-6-2, since in the state where the menu control part 44 is displaying "stop sharing", the notification of the display control flag "shared_another" is received, the menu control part 44 causes the display device 400 to display the "start sharing" button.

In step S304-6-3, the menu control part 44 reads the display control flag "shared_another", and causes the display device 400 to display the message "another display shared" ("shared_another" in FIG. 29) at the sharing state 402 (see FIG. 21B). By steps S304-6-2 and S304-6-3, the display device 400 of the external input apparatus 1 becomes one of FIG. 28D.

In step S303-1, on the other hand, when the arrangement information selection part 21 of the communication terminal 2 receives the notification of "delivery start event" in step S303, the arrangement information selection part 21 sets the share flag as "shared" according to the event flag table 24.

In step S303-2, the arrangement information selection part 21 of the communication terminal 2 selects the arrangement information No. 2 according to the arrangement information management table 23, and allocates the video data and the display data to the areas 1 through 4, respectively. Since the arrangement information selection part 21 has selected the arrangement information No. 2 in step S204-3 of FIG. 26, the arrangement information No. 2 is selected again.

In step S303-3, since the communication terminal 2 has been notified of "delivery start event" in step S303, the display data control part 22 sets the display control flag into "shared" according to the event flag table 24, and notifies the external input apparatus 2 of this display control flag.

In step S303-3-1, the menu control part 44 of the external input apparatus 2 determines based on the transition condition table 431 whether to change the display at the menu 401 according to the display control flag.

In step S303-3-2, since in the state where as shown in FIG. 28D, the "start sharing" button is being displayed, the external input apparatus 1 has received the display control flag "shared", the menu control part 44 changes the menu 401 of the display device 400 into the "stop sharing" button.

In step S303-3-3, since the menu control part 44 has received the display control flag "shared", the menu control part 44 displays the message "this display shared" ("shared" in FIG. 29) (see FIG. 21B) as the sharing state 402 as shown in FIG. 28C. Therefore, the screen of the display device 400 becomes one of FIG. 28C.

When the process of FIG. 29 is thus finished, the display device 400 of the external input apparatus 1 becomes one of FIG. 28D and the display device 400 of the external input apparatus 2 becomes one of FIG. 28C. That is, at the external input apparatus 1, the menu 401 has been changed from "stop sharing" into "start sharing", and the sharing state 402 has been changed from "this display shared" into "another display shared". Further, at the external input apparatus 2, the menu 401 has been changed from "start sharing" into "stop sharing", and the sharing state 402 has been changed from "another display shared" into "this display shared".

As described above for step S304-3, it is possible to control the display data to be displayed by the respective communication terminals 10 to be the single set of the display data since the external input apparatus 1 stops the transmission of the display data in response to "delivery from another start event" notified by the relay apparatus 30.

<Determination of Delivery Stop Request in Step S204-1 in FIG. 26 and Step S304-1 in FIG. 29>

Figure 30:
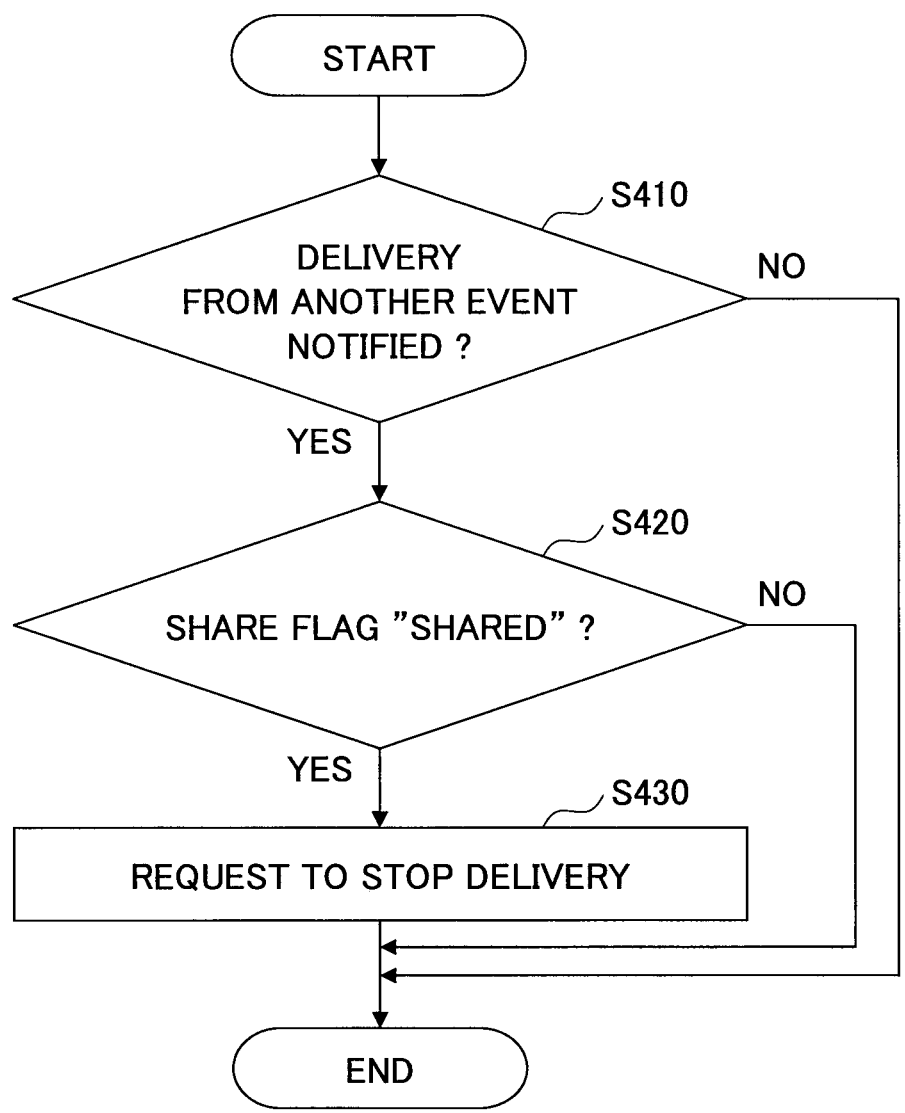
FIG. 30 is one example of a flowchart showing a procedure of determining whether to request to stop delivering in a case where the communication terminal has received "a delivery from another start event"

FIG. 30 is one example of a flowchart showing a procedure of determining whether to stop the delivery in a case where the communication terminal 10 has received "delivery from another start event".

This process is carried out when the communication terminal 1 has received "delivery from another start event" (step S410).

When having received "delivery from another start event", the display data control part 22 of the communication terminal 1 determines whether the share flag has been set into "shared" (step 420). In a case where the share flag is "shared", the display data delivered by the external input apparatus 1 connected to the own communication terminal 1 or the other external input apparatus 2 is being shared, and thus, the communication terminal 1 cannot respond to "delivery from another start event" in this state.

Therefore, in a case where the share flag is "shared" (step S420 YES), the display data control part 22 of the communication terminal 1 requests the relay apparatus 30 to stop the delivery (step S430). The relay apparatus 30 then stops the delivery of the display data to the communication terminal 1 having requested to stop the delivery (in FIG. 31, step S510).

<Determination in Step S304-2 in FIG. 29>

In response to being requested to stop the delivery by the communication terminal 1 (in FIG. 30, step S430), the relay apparatus 30 determines whether to notify of "delivery stop event" or "delivery from another stop event" to all of the other communication terminals 1 and 2, for the purpose of updating the share flags and the display control flags in the communication terminals 1 and 2.

Figure 31:
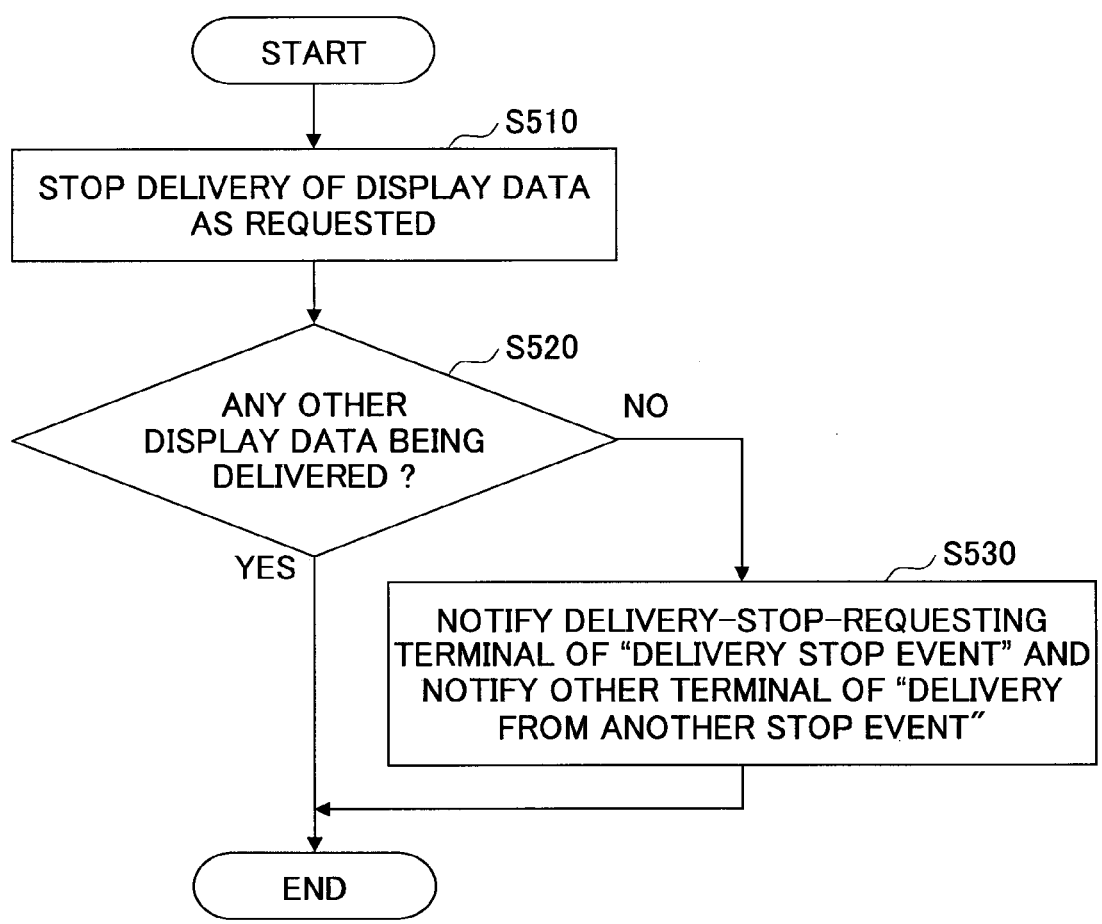
FIG. 31 is one example of a flowchart showing a determination procedure in the relay apparatus.

FIG. 31 is one example of a flowchart showing the determination procedure in the relay apparatus 30. First, the relay apparatus 30 stops the delivery of the display data for which it has been requested to stop the delivery (step S510).

Next, the relay apparatus 30 determines whether there is other display data which the relay apparatus 30 is delivering (step S520). That is, the relay apparatus 30 determines whether the display data is being transmitted from a location that is participating with the TV conference and the relay apparatus 30 is delivering the thus-transmitted display data.

In a case where there is other display data that the relay apparatus 30 is delivering (step S520 YES), the relay apparatus 30 sends neither "delivery stop event" notification nor "delivery from another stop event" notification to the communication terminals 1 and 2, in order to continue to deliver the display data.

In a case where there is no other display data that the relay apparatus is delivering (step S520 NO), the relay apparatus 30 notifies the communication terminal 1 which has requested to stop the delivery of "delivery stop event" and notifies the other communication terminal 2 of "delivery from another stop event" (step S530) for the purpose of updating the share flags and the display control flags in the communication terminals 1 and 2.

Thereby, in a case where there is still the display data that the relay apparatus 30 is delivering, the share flags in the communication terminals 1 and 2 are kept "shared" and the communication terminals 1 and 2 can continue to receive the delivered display data. In a case where there is no display data that the relay apparatus 30 is delivering, the communication terminals 1 and 2 can notify the corresponding external input apparatuses 1 and 2 of the display control flags "unshared".

[Stop to Transmit Display Data]

Figure 32:
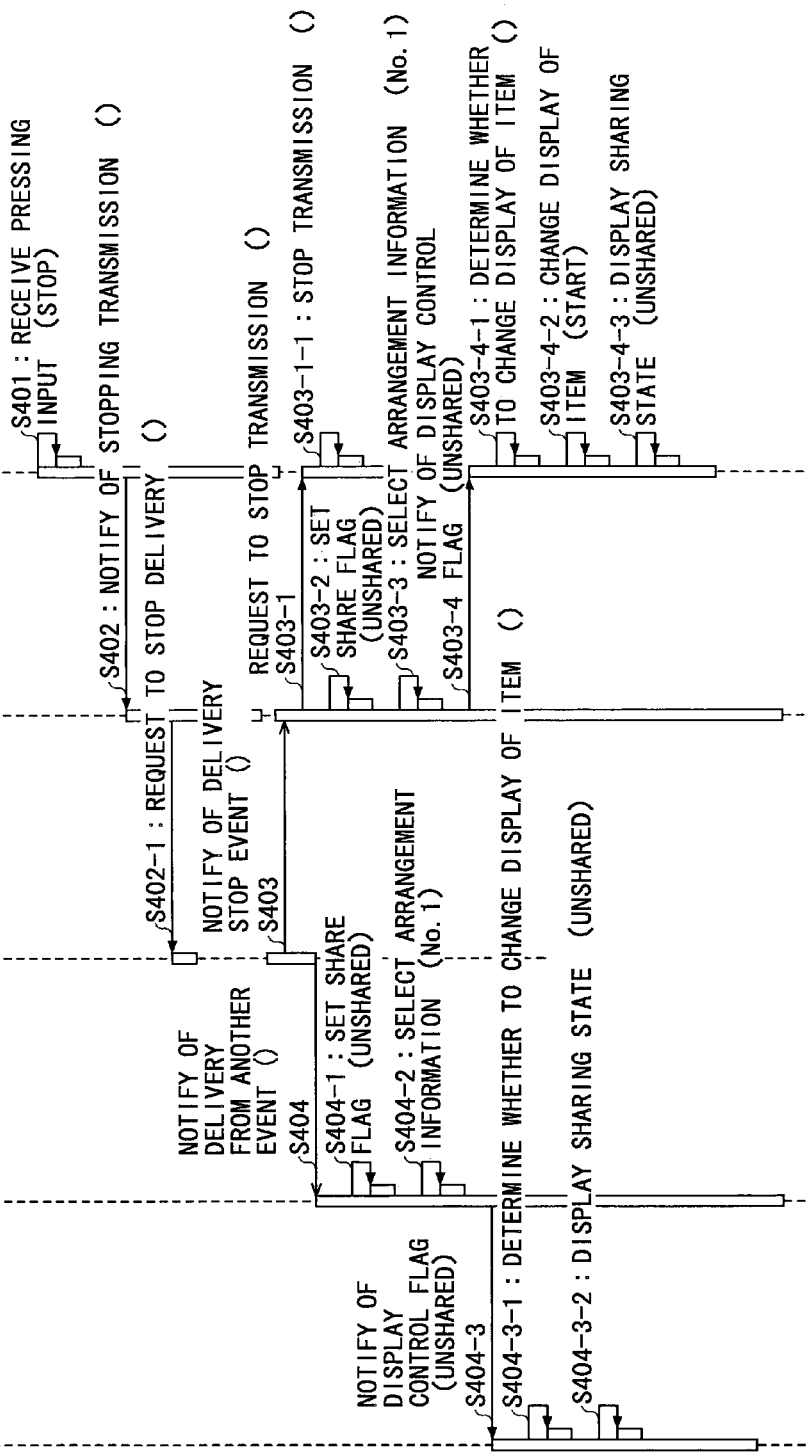
FIG. 32 is one example of a sequence diagram illustrating a procedure of the external input apparatus stopping transmission of the display data in a state where the process of FIG. 29 has been finished.

Next, a procedure of the external input apparatus 2 stopping the transmission of the display data in a state where the process of FIG. 29 has been finished will be described using a sequence diagram of FIG. 32. In a case where the participant intends to stop the transmission of the display data from the external input apparatus 2 of the own communication terminal 2, the participant presses the "stop sharing" button at the menu 401 displayed at the external input apparatus 2.

In step S401, the operation input reception part 46 of the external input apparatus 2 receives this operation of pressing the "stop sharing" button.

In step S402, the display data transmission part 452 notifies the communication terminal 2 of stopping the transmission.

In step S402-1, the display data control part 22 of the communication terminal 2 requests the relay apparatus 30 to stop the delivery. The data quality changing part 35 in the relay apparatus 30 determines whether to notify "delivery stop event" or "delivery from another stop event" according to FIG. 31.

In steps S403, S404, the display data which is being transmitted from the communication terminal 2 and the transmission of which is to be stopped now is only the display data that the relay apparatus 30 is delivering. Therefore, there is no other display data that the relay apparatus 30 is delivering (in FIG. 31, step S520 NO). Thus, the relay apparatus 30 notifies the communication terminal 2 of "delivery stop event" (step S403), and notifies the communication terminal 1 of "delivery from another stop event" (steps S404, S530 of FIG. 31). Thereby, the delivery of the display data of steps S104-1-1 and S104-1-2 is stopped. It is noted that since the relay apparatus 30 thus transmits "delivery stop event" to the communication terminal 2, the relay apparatus 30 does not need to stop the delivery of the display data to the communication terminal 2 according to step S510 of FIG. 31. However, the relay apparatus 30 may stop delivering the display data to the communication terminal 2 according to step S510 of FIG. 31 although it is redundant with the above-mentioned "delivery stop event".

In step S403-1, when receiving "delivery stop event", the display data control part 22 of the communication terminal 2 requests the external input apparatus 2 to stop the transmission of the display data.

In step S403-1-1, the display data transmission part 452 of the external input apparatus 2 stops the transmission of the display data to the communication terminal 2. By this stopping, the transmission of the display data in steps S104 and S104-1 of FIG. 25 is stopped. It is noted that it is also possible that the external input apparatus 2 stops the transmission of the display data to the communication terminal 2 in step S402 together with the notification of stopping the transmission.

In step S403-2, the arrangement information selection part 21 of the communication terminal 2 sets the share flag into "unshared" according to the event flag table 24 of FIG. 20.

In step S403-3, the arrangement information selection part 21 of the communication terminal 2 selects the arrangement information No. 1 according to the arrangement information management table 23 in response to the setting of the share flag. Thereby, the image display control part 14b allocates the respective sets of the video data to the areas 1 and 2 as shown in FIG. 27A, and displays the screen page.

In step S403-4, since the communication terminal 2 has been notified of "display stop event" in step S403, the display data control part 22 notifies the external input apparatus 40 of the display control flag "unshared" according to the event flag table 24.

In step S403-4-1, the menu control part 44 of the external input apparatus 2 determines whether to change the menu 401 according to the transition condition table 431 of FIG. 21A.

In step S403-4-2, since in the state where the external input apparatus 2 is displaying "stop sharing", the external input apparatus 2 has received the display control flag "unshared", the menu control part 44 displays "start sharing" button as the menu 401 on the display device 400.

In step S403-4-3, the menu control part 44 reads the display control flag and displays the message of the sharing state 402 on the display device 400. The message to be thus displayed as the sharing state 402 is "not shared" ("unshared" in FIG. 32) in the case where the display control flag is "unshared" (see FIG. 21B).

Steps S404-1 through S404-3-1 are approximately the same as steps S403-2 through S403-4.

In step S404-1, when receiving "delivery from another stop event", the display data control part 22 of the communication terminal 1 sets the share flag as "unshared" according to the event flag table 24 of FIG. 20. Since the transmission of the display data has been already stopped in step S304-3-1 in FIG. 29, it is not necessary to request the external input apparatus 1 to stop the transmission of the display data.

In step S404-2, the arrangement information selection part 21 of the communication terminal 1 selects the arrangement information No. 1 according to the arrangement information management table 23 in response to the setting of the share flag "unshared". Thereby, the image display control part 14b allocates the respective sets of the video data to the areas 1 and 2 as shown in FIG. 27A, and displays the screen page.

In step S404-3, since the communication terminal 1 has been notified of "delivery from another stop event" in step S404, the display data control part 22 notifies the external input apparatus 1 of the display control flag "unshared" according to the event flag table 24.

In step S404-3-1, the menu control part 44 of the external input apparatus 1 determines whether to change the menu 401 according to the transition condition table of FIG. 21A.

In step S404-3-2, since in the state where the external input apparatus 1 is displaying "start sharing", the external input apparatus 1 has received the display control flag "unshared", the menu control part 44 maintains the displaying of the "start sharing" button as it is.

In step S404-3-2, further, the menu control part 44 reads the display control flag and displays the message of the sharing state 402. The message to be thus displayed is "not shared" ("unshared" in FIG. 32) in the case where the display control flag is "unshared".

As a result of the process described above being finished, each of the respective display devices 400 of the external input apparatuses 1 and 2 is as shown in FIG. 28B. At the external input apparatus 1, the menu 401 is kept unchanged as "start sharing", but the message of the sharing state 402 is changed from "another display shared" into "not shared". At the external input apparatus 2, the menu 401 is changed from "stop sharing" into "start sharing", and the message of the sharing state 402 is changed from "this display shared" into "not shared".

<At Time of Disconnecting Session>

Figure 33:
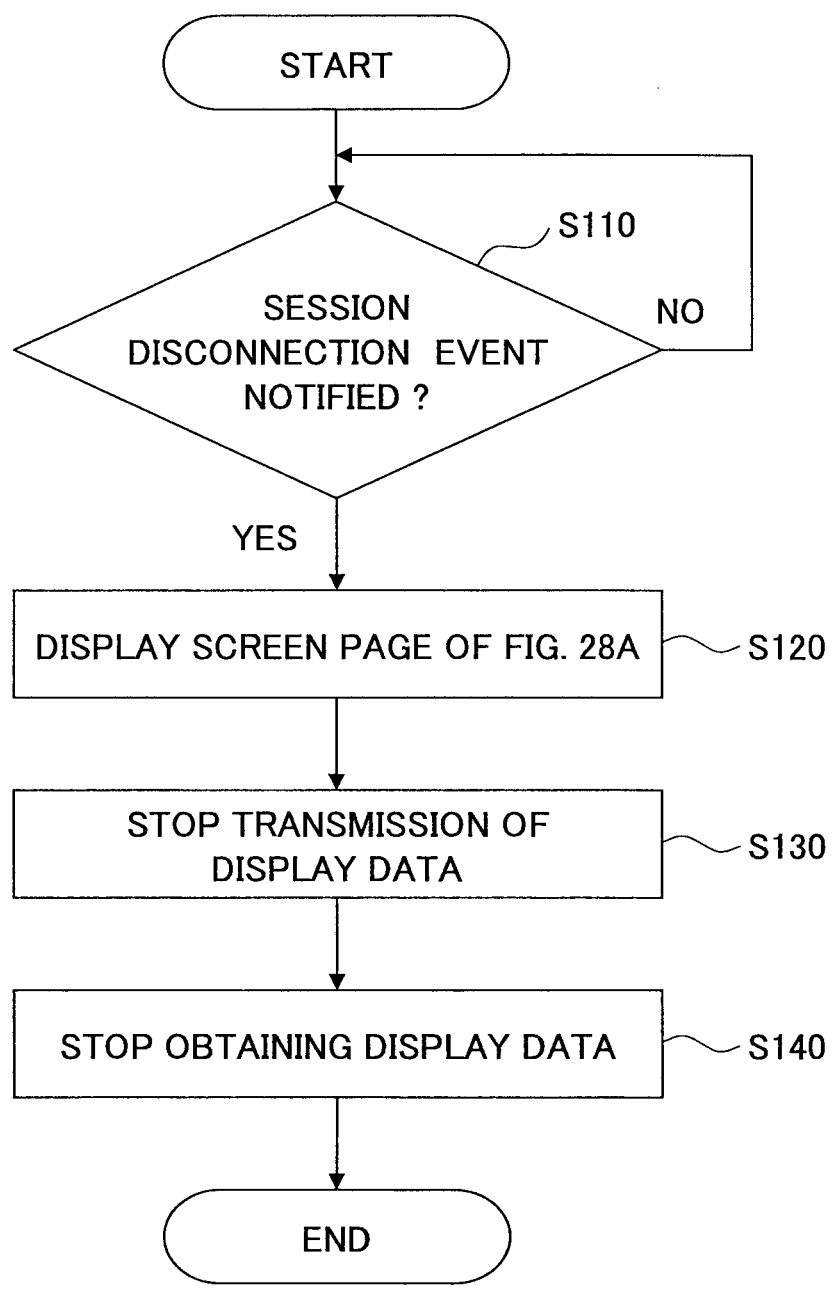
FIG. 33 is one example of a flowchart showing a process of disconnecting the session between the communication terminals.

FIG. 33 is one example of a flowchart showing a process of disconnecting the session between the communication terminals 1 and 2. When the participant gives an instruction to finish the TV conference (disconnect the session) by operating the operating button 108 shown in FIG. 2 of the communication terminal 1, the operation input reception part 12 shown in FIG. 4B receives the request to finish the conference with the communication terminal 2. The operation input reception part 12 then notifies the external input apparatus 1 of a session disconnection event. Other than this, in a case where the participant removes the USB cable connecting between the communication terminal 1 and the external input apparatus 1, or turns off the power supply in the communication terminal 1, the connection detection part 42 of the external input apparatus 1 detects or obtains the session disconnection event.

The menu control part 44 of the external input apparatus 1 then determines whether the external input apparatus 1 has obtained the notification of the session disconnection event, while displaying any one of the screen pages of FIGS. 28B through 28D (step S110). In a case where the external input apparatus 1 has not obtained the session disconnection event (step S110 NO), the menu control part 44 maintains the display of the screen page of the any one of the screen pages of FIGS. 28B through 28D.

In a case where the external input apparatus 1 has obtained the notification of the session disconnection event (step S110 YES), the menu control part 44 displays the screen page of FIG. 28A (step S120). This screen page notifies the participant that no conference is being conducted. Further, on the screen page of FIG. 28A, no characters/letters (text) are displayed at the menu 401 as mentioned above, and this means that sharing of the display data is not possible. The participant can understand that it is not necessary to operate the external input apparatus 1, from the message "no conference conducted" (meaning "no conference is being conducted").

The display data transmission part 452 of the external input apparatus 1 stops the transmission of the display data to the communication terminal 2 via the communication terminal 1, in a case of being transmitting the display data (step S130).

Further, the display data obtaining part 451 of the external input part 1 stops obtaining (capturing) the display data of the display device 400 (step S140).

According to the remote communication system 1 in the embodiment, it is possible to display the menu 401 at the external input apparatus 40 for starting sharing of the display data. Therefore, the participant of the TV conference can display the display data at another location merely by easy operation of pressing the "start sharing" button. Accordingly, the participant at the other location can determine the display data to pay attention to, without any operation such as selecting the display data to be shared.

Further, since the external input apparatus 40 displays the message of the sharing state 402, the participant of the TV conference can positively determine whether the display data currently being displayed on the display device 400 of the external input apparatus 40 is being shared. For example, in a case where the plural external input apparatuses 40 displaying the same material are connected with the respective communication terminals 10 at plural locations, the participants can immediately determine the material of which location is being shared, and thus, operating performance can be improved.

Further, in a case where the communication terminal 10 has received a notification of "delivery from another start event", the communication terminal 10 requests the external input apparatus 40 connected to the own communication terminal 10 to stop the delivery. Therefore, it is possible to control the display data that can be shared to be the single set of the display data. Thereby, the participant does not need to carry out such an operation to select the appropriate set of the display data to pay attention to from among plural sets of the display data, and thus, operating performance can be improved.

Although this invention has been described in detail with reference to certain embodiments, variations and modifications exist within the scope and spirit of the invention as described and defined in the following claims.

The present patent application is based on Japanese Priority Patent Application No. 2010-267774, filed Nov. 30, 2010, and Japanese Priority Patent Application No. 2011-175417, filed Aug. 10, 2011, the entire contents of which are hereby incorporated by reference.

The invention claimed is:

1. An external input apparatus which is connected with a first communication terminal which delivers video data to a second communication terminal connected via a network, comprising:
   a first display configured to display an image; and
   circuitry configured to
      obtain image data of the image displayed on the first display,
      transmit the obtained image data to the first communication terminal, the first communication terminal being connected to a second display and an image capturing device, the second display displaying the video data which is delivered to the second communication terminal and which includes second image data captured by the image capturing device that is different than the image data displayed on the first display,
      receive, from the first communication terminal, display control information indicating whether or not the first communication terminal receives the image data transmitted by the external input apparatus for transmission to the second communication terminal as part of the video data, and
      update a menu to be displayed on the first display based on the received display control information, the menu indicating whether or not the image data is shared by the first communication terminal with the second communication terminal as part of the video data.

2. The external input apparatus as claimed in claim 1, wherein the display control information comprises any one of first display control information indicating that the first communication terminal is sharing the image data of the external input apparatus with the second communication terminal, second display control information indicating that the first communication terminal is sharing image data of the second communication terminal and third display control information meaning that the first communication terminal is not sharing image data.

3. The external input apparatus as claimed in claim 2, wherein
when the external input apparatus has obtained the first display control information and the share menu is in a state for receiving an instruction to start sharing the image data, the circuitry is configured to control display of the share menu in a state for receiving an instruction to stop sharing the image data.

4. The external input apparatus as claimed in claim 2, wherein
when the external input apparatus has obtained the second display control information or the third display control information and the share menu is in a state for receiving an instruction to stop sharing the image data, the circuitry is configured to control display of the share menu in a state for receiving an instruction to start sharing the image data.

5. The external input apparatus as claimed in claim 2, further comprising:
a sharing state information storage configured to store sharing state information indicating a sharing state of the image data in a manner of being associated with the display control information, wherein
when having obtained the display control information, the circuitry is configured to control display of the sharing state information associated with the obtained display control information together with the share menu.

6. The external input apparatus as claimed in claim 1, wherein
when having received from the first communication terminal a notification indicating to finish communication with the second communication terminal, the circuitry is configured to display, by using the first display, that it is not possible to share the image data.

7. A communication terminal as the first communication terminal configured to connect to the external input apparatus claimed in claim 1, comprising:
a display control information storage configured to store the display control information in a manner of being associated with a delivery event for the image data to be reported by the second communication terminal; and
circuitry configured to determine the display control information associated with the delivery event, and notify the external input apparatus of the determined display control information.

8. The communication terminal as claimed in claim 7, wherein
the delivery event comprises any one of a first delivery event notifying of starting delivery of the image data of the external input apparatus, a second delivery event notifying of starting delivery of the image data of the second communication terminal, a third delivery event notifying of stopping delivery of the image data of the external input apparatus, and a fourth delivery event notifying of stopping delivery of the image data of the second communication terminal.

9. The communication terminal as claimed in claim 8, wherein when having obtained a notification of the first delivery event, the circuitry of the communication terminal is configured to notify the external input apparatus of the first display control information, associated with the notification in the display control information storage, indicating that the communication terminal is sharing the image data of the external input apparatus with the second communication terminal.

10. The communication terminal as claimed in claim 8, wherein
when having obtained a notification of the second delivery event, the circuitry of the communication terminal is configured to request the external input apparatus to stop transmission of the image data, and notify the external input apparatus of the second display control information, associated with the notification in the display control information storage, indicating that the communication terminal is sharing the image data of the second communication terminal.

11. The communication terminal as claimed in claim 7, further comprising:
the second display configured to display the video data;
a share information storage configured to store share information used for sharing the second display for the video data and the image data in a manner associated with the delivery event;
an arrangement information storage configured to store arrangement information associating plural areas of the second display with the video data and the image data according to the share information; and
the circuitry is configured to determine, according to the share information storage, the share information associated with the delivery event reported by the second communication terminal, and control display the video data or the image data at the areas based on the arrangement information associated with the share information.

12. The communication terminal as claimed in claim 11, wherein
when having received a notification of the first delivery event or when having received a notification of the second delivery event, the circuitry is configured to display the image data at a largest one of the areas, and display the video data at another one of the areas.

13. The external input apparatus as claimed in claim 1, wherein the image displayed on the first display is of document software data, spreadsheet software data, or presentation software data.

14. A display data sharing system comprising:
a first communication terminal configured to deliver video data to a second communication terminal connected via a network; and
an external input apparatus connected with the first communication terminal, wherein
the external input apparatus comprises:
a first display configured to display an image;
circuitry configured to
obtain image data of the image displayed on the first display,
transmit the obtained image data to the first communication terminal, the first communication terminal being connected to a second display and an image capturing device, the second display displaying the video data which is delivered to the second communication terminal and which includes second image data captured by the image capturing device that is different than the image data displayed on the first display, receive, from the first communication terminal, display control information indicating whether or not the first communication terminal receives the image data transmitted by the external input apparatus for transmission to the second communication terminal as part of the video data, and update a menu to be displayed on the first display based on the received display control information, the menu indicating whether or not the image data is shared by the first communication terminal with the second communication terminal as part of the video data.

15. A non-transitory computer readable information recording medium storing a program executed by an external input apparatus which includes a first display configured to display an image and is connected with a first communication terminal that delivers video data to a second communication terminal connected via a network, the program when executed by the external input apparatus, causes the external input apparatus to perform a method comprising:

obtaining image data of the image displayed on the first display, transmitting the obtained image data to the first communication terminal, the first communication terminal being connected to a second display and an image capturing device, the second display displaying the video data which is delivered to the second communication terminal and which includes second image data captured by the image capturing device that is different than the image data displayed on the first display, receiving, from the first communication terminal, display control information indicating whether or not the first communication terminal receives the image data transmitted by the external input apparatus for transmission to the second communication terminal as part of the video data, and updating a menu to be displayed on the first display based on the received display control information, the menu indicating whether or not the image data is shared by the first communication terminal with the second communication terminal as part of the video data.

16. A non-transitory computer readable information recording medium storing a program executed by a communication terminal as the first communication terminal connected with the external input apparatus claimed in claim 15, the program when executed by the communication terminal, causes the communication terminal to perform a method comprising:

receiving a notification of a delivery event for the image data from the second communication terminal;

determining the display control information associated with the notified delivery event according to a display control information storage configured to store the display control information in a manner of being associated with the delivery event; and notifying the external input apparatus of the display control information.

17. A system which delivers video data to a communication terminal connected via a network, comprising:

circuitry configured to:

control display of an image corresponding to a first application in a first display area, obtain image data of the image, share the obtained image data with a second application, the second application corresponding to a second display area, the second application controlling display of the video data which is delivered to the communication terminal and which includes second image data captured by an image capturing device that is different than the image data displayed on the first display, receive, by the first application, display control information from the second application indicating whether or not the second application receives the image data for transmission to the communication terminal as part of the video data, and update a menu to be displayed on the first display area based on the received display control information, the menu indicating whether or not the image data is shared by the second application with the communication terminal as part of the video data.

\* \* \* \* \*